US010453260B2

(12) United States Patent
Alaniz et al.

(10) Patent No.: US 10,453,260 B2
(45) Date of Patent: Oct. 22, 2019

(54) SYSTEM AND METHOD FOR DYNAMIC IN-VEHICLE VIRTUAL REALITY

(71) Applicant: Honda Motor Co., Ltd., Tokyo (JP)

(72) Inventors: Arthur Alaniz, Mountain View, CA (US); Joseph Whinnery, Scotts Valley, CA (US); Robert Wesley Murrish, Santa Clara, CA (US); Michael Eamonn Gleeson-May, San Francisco, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/454,598

(22) Filed: Mar. 9, 2017

(65) Prior Publication Data

US 2017/0186240 A1    Jun. 29, 2017

Related U.S. Application Data

(63) Continuation of application No. 14/455,020, filed on Aug. 8, 2014, now Pat. No. 9,715,764, which is a
(Continued)

(51) Int. Cl.
*G06T 19/00* (2011.01)
*G06F 3/01* (2006.01)
(Continued)

(52) U.S. Cl.
CPC .......... *G06T 19/006* (2013.01); *A63F 13/211* (2014.09); *A63F 13/216* (2014.09);
(Continued)

(58) Field of Classification Search
CPC ...... G06T 19/006; G01C 21/365; G06F 3/011
(Continued)

(56) References Cited

U.S. PATENT DOCUMENTS 5,583,526 A    12/1996   Socks et al.
5,615,132 A    3/1997    Horton
(Continued)

FOREIGN PATENT DOCUMENTS

DE    102009027026    12/2010
JP    2013257716      12/2013

OTHER PUBLICATIONS

Office Action of U.S. Appl. No. 15/359,138 dated Jul. 14, 2017, 54 pages.
(Continued)

*Primary Examiner* — Barry Drennan
*Assistant Examiner* — Terrell M Robinson
(74) *Attorney, Agent, or Firm* — Rankin, Hill & Clark LLP

(57) ABSTRACT

A computer-implemented method for rendering views to an output device in a vehicle that is restricted to a fixed track that has a predetermined fixed path. Vehicle data about the vehicle is received from an off-vehicle device that is located remotely from the vehicle and along the predetermined fixed path. The vehicle data includes a velocity, an orientation, and a location of the vehicle. User data about a user in a vehicle is received that includes a velocity, an orientation, and a location. The method includes generating a view based on the vehicle data, the user data, and a model. The model includes one or more components that define the view. The method includes determining a difference between the vehicle data and the user data, and rendering the view to the output device by controlling the output device to display the view according to the determined difference.

20 Claims, 9 Drawing Sheets

Related U.S. Application Data continuation-in-part of application No. 14/177,841, filed on Feb. 11, 2014, now Pat. No. 9,547,173.

(60) Provisional application No. 61/886,240, filed on Oct. 3, 2013.

(51) Int. Cl.

| | | |
|---|---|---|
| *G06F 3/0481* | (2013.01) | |
| *A63F 13/211* | (2014.01) | |
| *A63F 13/65* | (2014.01) | |
| *A63F 13/216* | (2014.01) | |
| *G01C 21/36* | (2006.01) | |
| *G06T 7/70* | (2017.01) | |
| *B60K 35/00* | (2006.01) | |
| *G06T 7/20* | (2017.01) | |
| *A63F 13/5255* | (2014.01) | |
| *A63F 13/332* | (2014.01) | |

(52) U.S. Cl.
CPC .............. *A63F 13/65* (2014.09); *B60K 35/00* (2013.01); *G01C 21/365* (2013.01); *G06F 3/011* (2013.01); *G06F 3/04815* (2013.01); *G06T 7/20* (2013.01); *G06T 7/70* (2017.01); *A63F 13/332* (2014.09); *A63F 13/5255* (2014.09); *B60K 2370/152* (2019.05); *B60K 2370/155* (2019.05); *B60K 2370/55* (2019.05); *B60K 2370/589* (2019.05); *B60K 2370/77* (2019.05)

(58) Field of Classification Search
USPC ........................................................ 345/633
See application file for complete search history.

(56) References Cited

U.S. PATENT DOCUMENTS

| | | | |
|---|---|---|---|
| 6,004,243 A | 12/1999 | Ewert | |
| 6,005,578 A | 12/1999 | Cole | |
| 6,116,744 A | 9/2000 | Batterman | |
| 6,441,748 B1 | 8/2002 | Takagi | |
| 6,462,769 B1* | 10/2002 | Trowbridge | A63G 31/16 |
| | | | 348/51 |
| 6,513,833 B2 | 2/2003 | Breed et al. | |
| 6,618,075 B2* | 9/2003 | Tomita | H04N 5/2353 |
| | | | 348/157 |
| 6,692,428 B1 | 2/2004 | Kania | |
| 6,932,090 B1 | 8/2005 | Reschke et al. | |
| 6,983,283 B2* | 1/2006 | Sowizral | G06T 15/20 |
| 7,301,547 B2 | 11/2007 | Martins et al. | |
| 7,375,728 B2 | 5/2008 | Donath et al. | |
| 7,551,103 B2 | 6/2009 | Schofield | |
| 7,693,702 B1 | 4/2010 | Kemer et al. | |
| 7,769,540 B2 | 8/2010 | Pinkus et al. | |
| 7,918,781 B1* | 4/2011 | Smyth | A61M 21/00 |
| | | | 600/27 |
| 8,264,505 B2 | 9/2012 | Bathiche et al. | |
| 8,310,537 B2 | 11/2012 | Marti et al. | |
| 8,457,880 B1 | 6/2013 | Malalur | |
| 8,708,884 B1 | 4/2014 | Smyth | |
| 9,082,208 B2 | 7/2015 | Gabel et al. | |
| 9,805,508 B1 | 10/2017 | Jagmag | |
| 2002/0141618 A1 | 10/2002 | Ciolli | |
| 2005/0159865 A1 | 7/2005 | Bos | |
| 2006/0262140 A1 | 11/2006 | Kujawa et al. | |
| 2007/0034212 A1 | 2/2007 | Brendley et al. | |
| 2008/0122737 A1 | 5/2008 | Lea et al. | |
| 2008/0183344 A1 | 7/2008 | Doyen et al. | |
| 2008/0310707 A1 | 12/2008 | Kansal et al. | |
| 2009/0002142 A1 | 1/2009 | Morimoto et al. | |
| 2009/0005961 A1 | 1/2009 | Grabowski et al. | |
| 2009/0079555 A1 | 3/2009 | Aguirre De Carcer | |
| 2009/0112452 A1 | 4/2009 | Buck | |
| 2010/0039318 A1 | 2/2010 | Kmiecik et al. | |
| 2010/0253541 A1 | 10/2010 | Seder et al. | |
| 2010/0256836 A1 | 10/2010 | Mudalige | |
| 2010/0292886 A1 | 11/2010 | Szczerba et al. | |
| 2010/0321572 A1* | 12/2010 | Cornett | H04N 7/002 |
| | | | 348/552 |
| 2011/0010022 A1* | 1/2011 | Beavin | G05D 1/0044 |
| | | | 701/2 |
| 2011/0055726 A1 | 3/2011 | Hamilton, II et al. | |
| 2011/0149094 A1* | 6/2011 | Chen | H04N 5/23248 |
| | | | 348/208.3 |
| 2011/0193773 A1 | 8/2011 | Uphill et al. | |
| 2011/0199200 A1 | 8/2011 | Lueke et al. | |
| 2012/0154441 A1 | 6/2012 | Kim | |
| 2012/0173069 A1 | 7/2012 | Tsimhoni | |
| 2012/0224060 A1 | 9/2012 | Gurevich et al. | |
| 2012/0236030 A1 | 9/2012 | Border et al. | |
| 2013/0076787 A1 | 3/2013 | Mathieu et al. | |
| 2013/0083061 A1 | 4/2013 | Mishra et al. | |
| 2013/0147840 A1 | 6/2013 | Seder et al. | |
| 2013/0162632 A1 | 6/2013 | Varga et al. | |
| 2013/0188258 A1 | 7/2013 | Mathieu | |
| 2013/0249942 A1 | 9/2013 | Green et al. | |
| 2013/0278631 A1 | 10/2013 | Border et al. | |
| 2013/0293582 A1* | 11/2013 | Ng-Thow-Hing | G06T 19/006 |
| | | | 345/633 |
| 2014/0128144 A1 | 5/2014 | Bavitz et al. | |
| 2014/0152792 A1 | 6/2014 | Krueger | |
| 2014/0176296 A1* | 6/2014 | Morgan | G06F 3/011 |
| | | | 340/4.13 |
| 2015/0288944 A1 | 10/2015 | Nistico et al. | |
| 2016/0134848 A1 | 5/2016 | Watanabe et al. | |
| 2016/0209648 A1* | 7/2016 | Haddick | G02B 27/0093 |
| 2016/0275801 A1 | 9/2016 | Kopardekar | |

OTHER PUBLICATIONS

"Motion and Spatiality in a Gaming Situation Enhancing Mobile Computer Games with the Highway Experience", Liselott Brunnberg & Oskar Juhlin, 8 pages.

Search Report of DE Application No. 102014220053.9 dated May 7, 2015, 12 pages.

Search Report of DE Application No. 102014220053.9 dated May 7, 2015, 8 pages (English Translation).

Office Action of U.S. Appl. No. 14/291,854 dated Jun. 18, 2015, 39 pages.

Office Action of U.S. Appl. No. 14/177,841 dated Jun. 5, 2015, 36 pages.

Office Action of U.S. Appl. No. 14/455,020 dated Sep. 10, 2015, 57 pages.

Office Action of U.S. Appl. No. 14/541,364 dated Sep. 10, 2015, 38 pages.

Office Action of U.S. Appl. No. 14/328,148 dated Sep. 8, 2015, 45 pages.

Office Action of U.S. Appl. No. 14/177,841 dated Oct. 1, 2015, 43 pages.

Office Action of U.S. Appl. No. 14/291,854 dated Oct. 21, 2015, 51 pages.

Office Action of U.S. Appl. No. 14/328,148 dated Jan. 14, 2016, 61 pages.

Office Action of U.S. Appl. No. 14/541,364 dated Feb. 4, 2016, 40 pages.

Office Action of U.S. Appl. No. 14/455,020 dated Feb. 12, 2016, 62 pages.

Office Action of U.S. Appl. No. 14/291,854 dated Jun. 20, 2016, 44 pages.

Office Action of U.S. Appl. No. 14/541,364 dated Aug. 8, 2016.

Office Action of U.S. Appl. No. 14/455,020 dated Aug. 11, 2016.

Office Action of U.S. Appl. No. 14/455,020 dated Jan. 27, 2017, 23 pages.

Office Action of U.S. Appl. No. 15/359,138 dated Feb. 3, 2017, 39 pages.

Office Action of U.S. Appl. No. 14/177,841 dated Jun. 20, 2016, 36 pages.

(56) References Cited

OTHER PUBLICATIONS

Office Action of U.S. Appl. No. 14/328,148 dated Jun. 30, 2016, 48 pages.
Office Action of U.S. Appl. No. 14/541,364 dated Apr. 5, 2016, 16 pages.
Office Action of U.S. Appl. No. 15/420,536 dated Feb. 26, 2018, 86 pages.
Office Action of U.S. Appl. No. 13/359,138 dated Nov. 21, 2017, 77 pages.
Office Action of U.S. Appl. No. 15/420,536 dated Aug. 17, 2017, 59 pages.
Office Action of U.S. Appl. No. 15/455,374 dated Sep. 7, 2017, 50 pages.
Notice of Allowance of U.S. Appl. No. 15/359,138 dated Nov. 1, 2018, 10 pages.
Office Action of U.S. Appl. No. 15/955,865 dated Jun. 7, 2018, 76 pages.
Office Action of U.S. Appl. No. 15/420,536 dated May 30, 2018, 7 pages.
Office Action of U.S. Appl. No. 15/359,138 dated Jun. 19, 2018, 70 pages.
Office Action of U.S. Appl. No. 15/955,865 dated Dec. 14, 2018, 74 pages.
Notice of Allowance of U.S. Appl. No. 15/420,536 dated Dec. 18, 2018, 19 pages.
Office Action of U.S. Appl. No. 16/262,802 dated Feb. 25, 2019, 45 pages.
Office Action of U.S. Appl. No. 15/955,865 dated Apr. 1, 2019, 52 pages.
Office Action of U.S. Appl. No. 16/262,814 dated Apr. 1, 2019, 66 pages.
Office Action of U.S. Appl. No. 16/262,826 dated Mar. 21, 2019, 62 pages.
Office Action of U.S. Appl. No. 16/263,266 dated Apr. 4, 2019, 21 pages.
Office Action of U.S. Appl. No. 16/265,602 dated Mar. 22, 2019, 68 pages.
Office Action of U.S. Appl. No. 16/265,657 dated Mar. 22, 2019, 82 pages.
Office Action of U.S. Appl. No. 16/265,687 dated Mar. 21, 2019, 60 pages.
Office Action of U.S. Appl. No. 16/265,712 dated Apr. 4, 2019, 22 pages.
Office Action of U.S. Appl. No. 15/420,536 dated Jun. 28, 2018, 71 pages.
Foxlin, Eric, "FlightTracker: A Novel Optical/Inertial Tracker for Cockpit Enhanced Vision", 2004, ACM, pp. 1-10 [retrieved on Jun. 11, 2018], Retrieved from the Internet <URL:https://dl.acm.org/citation.cfm?id=1033718>.

* cited by examiner

SYSTEM AND METHOD FOR DYNAMIC IN-VEHICLE VIRTUAL REALITY

RELATED APPLICATIONS

This application is a continuation of U.S. patent application Ser. No. 14/455,020 filed on Feb. 8, 2014 and now published as U.S. Pub. No. 2015/0097864, which is expressly incorporated herein by reference. Furthermore, U.S. patent application Ser. No. 14/455,020 is a continuation-in-part of U.S. patent application Ser. No. 14/177,841 filed on Feb. 11, 2014 and now issued as U.S. Pat. No. 9,547,173, which claims priority to U.S. Provisional Application Ser. No. 61/886,240 filed on Oct. 3, 2013, both of which are expressly incorporated herein by reference.

BACKGROUND

Truly immersive virtual reality and augmented reality systems create environments that submerge the perceptual system of a user in computer-generated stimuli (e.g., a virtual world and/or a virtual view). Typically, these immersive systems captivate the senses of the user while blocking out stimuli from the physical world. The virtual world can be altered as a result of an input from the user and/or an interaction of the user with the virtual world.

Although, a goal of these systems is to create an immersive environment, the physical world can still be used to provide a context for the immersive environment. In particular, it is important to consider the environment and context of the user. For example, in the context of a user in a vehicle, immersive virtual reality and augmented reality systems can consider information about the user, the vehicle and the user in relation to the vehicle. This information can be used to generate an immersive environment that is customized to the user and the user's environment and can allow the user to perceive the immersive environment comfortably.

BRIEF DESCRIPTION

According to one aspect, a method for in-vehicle dynamic virtual reality includes receiving vehicle data and user data from one or more portable devices, wherein the vehicle data comprises vehicle dynamics data of the vehicle. The method includes generating a virtual view based on the vehicle data, the user data and a virtual world model, the virtual world model including one or more components that define the virtual view, wherein generating the virtual view includes augmenting one or more components of the virtual world model according to at least one of the vehicle data and the user data. The method includes rendering the virtual view to an output device by controlling the output device to update display of the virtual view according to at least one of the vehicle data or the user data.

According to another aspect, a vehicle computing system for in-vehicle dynamic virtual reality includes one or more portable devices that receive and transmit vehicle data and user data and a processor operably connected to the one or more portable devices. The processor includes a virtual reality data module that receives vehicle data and user data from the one or more portable devices, wherein the vehicle data comprises vehicle dynamics data. The processor includes a dynamic virtual reality module that generates a virtual view based on the vehicle data, the user data and the virtual world model from the virtual reality data module, wherein generating the virtual view comprises augmenting one or more components of the virtual world model according to at least one of the vehicle data and the user data. The processor includes a rendering module that renders the virtual view generated by the dynamic reality module to an output device by controlling the output device to update display of the virtual view according to at least one of the vehicle data or the user data.

According to another aspect, a non-transitory computer-readable storage medium storing instructions that, when executed by a vehicle computer, causes the computer to perform a method, wherein the method includes receiving vehicle data and user data from one or more portable devices, the vehicle data comprising vehicle dynamics data of the vehicle. The method includes generating a virtual view based on the vehicle data, the user data and a virtual world model, the virtual world model comprising one or more components that define the virtual view, wherein generating the virtual view comprises augmenting one or more components of the virtual world model according to at least one of the vehicle data and the user data. The method includes rendering the virtual view to an output device by controlling the output device to update display of the virtual view according to at least one of the vehicle data or the user data.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
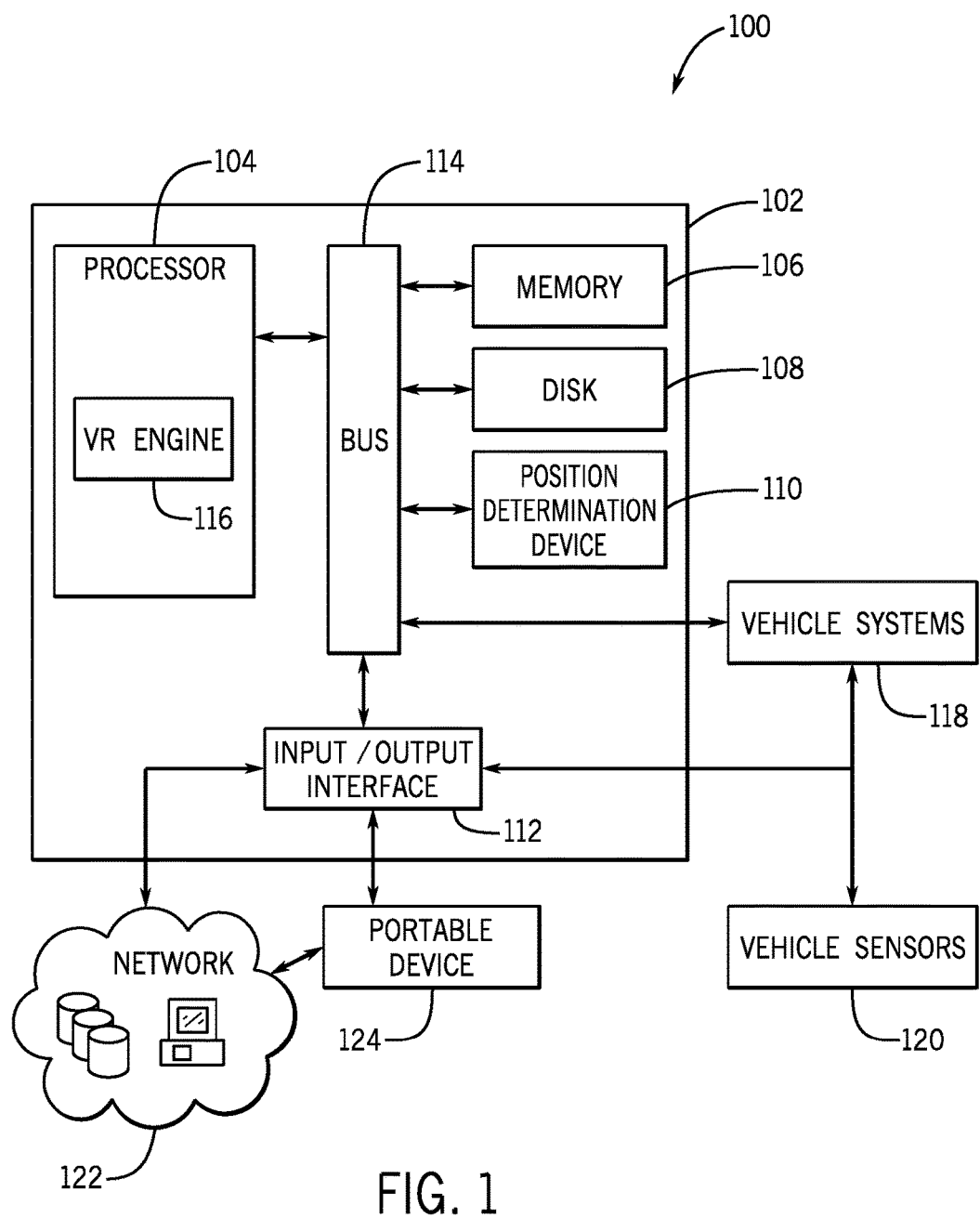
FIG. 1 is a schematic view of an exemplary operating environment for dynamic in-vehicle virtual reality systems and methods according to one aspect of the present disclosure.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely. As will be discussed herein, the portable device can include on-vehicle devices and off-vehicle devices.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system", as used herein can include, but are not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

I. Exemplary System for Dynamic in-Vehicle Virutal Reality

Figure 2:
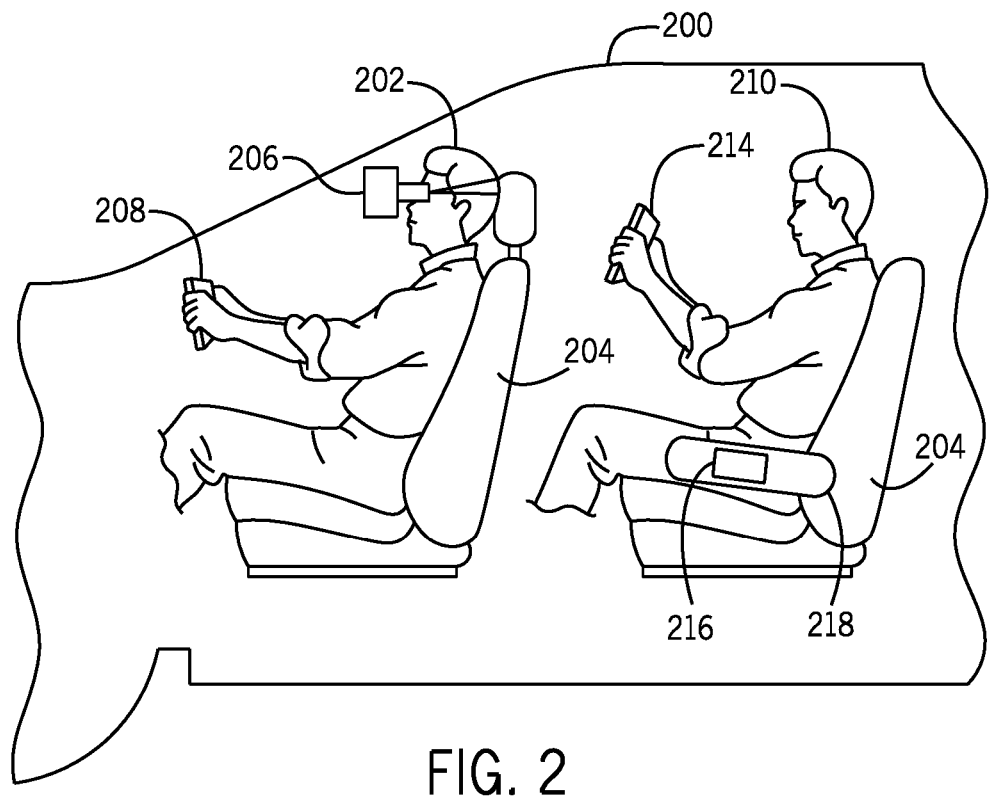
FIG. 2 is a schematic view of an exemplary vehicle and exemplary vehicle occupants implementing in-vehicle virtual reality systems and methods according to one or more aspects of the present disclosure.

Referring now to the drawings, wherein the showings are for purposes of illustrating one or more exemplary embodiments and not for purposes of limiting same, FIG. 1 is a schematic view of an operating environment 100 for implementing dynamic in-vehicle virtual reality systems and methods according to an exemplary embodiment. The components of environment 100, as well as the components of other systems, hardware architectures and software architectures discussed herein, can be combined, omitted or organized into different architectures for various embodiments. Further, the components of the operating environment 100 can be implemented with or associated with a vehicle. For example, FIG. 2 illustrates a vehicle 200 implementing dynamic in-vehicle virtual reality systems and methods.

In the illustrated embodiment of FIG. 1, the environment 100 of FIG. 1 includes a computing device 102 with provisions for processing, communicating and interacting with various components of a vehicle (e.g., the vehicle 200, FIG. 2) and other components of the environment 100. In one embodiment, the computing device 102 can be implemented with the vehicle 200 (FIG. 2), for example, as part of a telematics unit, a head unit, a navigation unit, an infotainment unit, an electronic control unit, among others. In other embodiments, the computing device 102 can be implemented remotely from the vehicle 102, for example, with a portable device, an input/output device or at a device connected via a network, as will be described in further detail herein. It is understood that the functions and components of the computing device 102, including a processor 104, can be modified and/or organized into different architectures for these various implementations discussed above.

Generally, the computing device 102 includes the processor 104, a memory 106, a disk 108, a position determination device 110 and an input/output (I/O) interface 112, which are each operably connected for computer communication via a bus 114 (e.g., a Controller Area Network (CAN) or a Local Interconnect Network (LIN) protocol bus) and/or other wired and wireless technologies. The I/O interface 112 provides software and hardware to facilitate data input and output between the components of the computing device 102 and other components, networks and data sources, which will be described herein. Additionally, as will be described in further detail with the systems and the methods discussed herein, the processor 104 includes a virtual reality (VR) engine 116 suitable for providing a dynamic in-vehicle virtual reality environment to a user (e.g., a vehicle occupant (FIG. 2)) facilitated by the components of the environment 100.

The computing device 102 is also operably connected for computer communication (e.g., via the bus 114 and/or the I/O interface 112) to one or more vehicle systems 118. Vehicle systems can include, but are not limited to, any automatic or manual systems that can be used to enhance the vehicle, driving and/or safety. The vehicle systems 118 include and/or are operably connected for computer communication to various vehicle sensors 120, the vehicle sensors 120 providing and/or sensing information associated with the vehicle, the vehicle environment and/or the vehicle systems 118. The vehicle sensors 120, can include, but are not limited to, vehicle state sensors, vehicle system state sensors, proximity sensors, vision sensors, audio sensors, motion sensors, and other sensors. The vehicle sensors 120 can also include sensors of the position determination device 110, for example global positioning system (GPS) sensors, inertial measurement unit sensors (IMU), among other position and motion sensors. Other specific vehicle system sensors can include, but are not limited to, vehicle speed sensors, accelerator pedal sensors, brake sensors, throttle position sensors, wheel sensors, anti-lock brake sensors, camshaft sensors, among others.

The vehicle sensors 120 are operable to sense a measurement of data associated with the vehicle, the vehicle environment, the vehicle systems 118, and/or occupants of the vehicle, and generate a data signal indicating said measurement of data. These data signals can be converted into other data formats (e.g., numerical) and/or used by the vehicle systems 118 and/or the computing device 102 to generate other data metrics and parameters. In one embodiment, the computing device 102 and components thereof can access and/or receive data (e.g., vehicle data, user data and other data (FIG. 3)) from the plurality of vehicle systems 118 and/or the vehicle sensors 120.

The computing device 102 is also operatively connected for computer communication to a network 122 and one or more portable devices 124. It is understood that the connection from the I/O interface 112 to the network 122 and the portable devices 124 can be facilitated in various ways, for example, through a network connection (e.g., wired or wireless), a cellular data network from the portable device 124, a vehicle to vehicle ad-hoc network (not shown), an in-vehicle network (not shown), among others.

The network 122 is, for example, a data network, the Internet, a wide area network or a local area network. The network 122 serves as a communication medium to various remote devices (e.g., databases, web servers, remote servers, application servers, intermediary servers, client machines, other portable devices (not shown)). It is understood, that in some embodiments, the portable devices 124 can be included in the network 122, accessed by the computing device 102 through the network 122, and/or the network 122 can access the portable devices 124 directly. Thus, in some embodiments, the computing device 102 can obtain data from the portable device 124 via the network 122. As will be discussed in an example herein, in some embodiments, the network 122 is a vehicle-to-vehicle (V2V) network, that can connect and communicate with other vehicles.

The one or more portable devices 124 are generally devices that provide input and/or output to the computing device 102, and in particular, the VR engine 116, to facilitate and provide a dynamic in-vehicle virtual reality environment to a user. In other embodiments, the one or more portable devices are sources for data and provide the data to computing device 102, and in particular, the VR engine 116, to facilitate and provide a dynamic in-vehicle virtual reality environment to a user. Thus, the portable devices 124, can obtain and/or provide data (e.g., vehicle data, user data, other data (FIG. 3)) to the computing device 102, and in particular to the VR engine 116. It is understood that in some embodiments, the portable device 124 can include the components and functions of the computing device 102, including the VR engine 116. It is also understood that the portable devices 124 can also include speakers or headphones for audio input and output. For example, the portable device 124 and can utilize wireless or wired technology for computer communication with the computing device 102. In another embodiment, the portable device 124 can connect to and utilize the audio input and output hardware and software (not shown) of the vehicle. Various input/output technologies can be implemented with the systems and methods described herein.

In some embodiments, the portable devices 124 can be a smart phone, a mobile device, a tablet, a data source, an HMI of a vehicle display, an output display, a navigation device, among others. In one embodiment, the portable device 124 can also be an output device (e.g., a vehicle display) used to render and view a virtual world. In another embodiment, the portable devices 124 can be virtual reality devices, for example, a virtual reality tracking device, a head-mounted display, virtual reality clothing, a virtual reality input device, virtual reality glasses, camera tracking systems in the vehicle for monitoring the user, the vehicle and/or the vehicle environment, among others. Further, the portable devices 124, in some embodiments, can be on-vehicle devices, for example, associated with the vehicle and/or a vehicle occupant of the vehicle. In another embodiment, the portable devices 124 are off-vehicle devices, associated with another vehicle and/or a vehicle occupant of another vehicle. In some embodiments, the portable devices 124 include on-vehicle and off-vehicle devices.

More specifically, the portable devices 124 as an off-vehicle device, can be external or remote from the vehicle. Thus, the portable devices 124 can obtain data (e.g., vehicle data) externally from the vehicle. Accordingly, the vehicle data can include data about the external environment of the vehicle. For example, the portable device 124 can be an imaging unit (e.g., a camera, a video camera) attached to a stationary object along a road (e.g., a street light, a traffic light, a roadway sign). In another embodiment, the portable device 124 is operably connected for computer communication to external sensors and/or the portable device 124 can include sensors that sense vehicle data externally from the vehicle. For example, road sensors, rail sensors, sensors mounted to external areas of the vehicle or sensors mounted to another vehicle. These sensors are operable to sense a measurement of data associated with the vehicle externally from the vehicle and generate a data signal indicating said measurement of data. These data signals can be converted into other data formats (e.g., numerical) and/or used by the portable device 124 and/or the computing device 102 to generate other data metrics and parameters.

Figure 8:
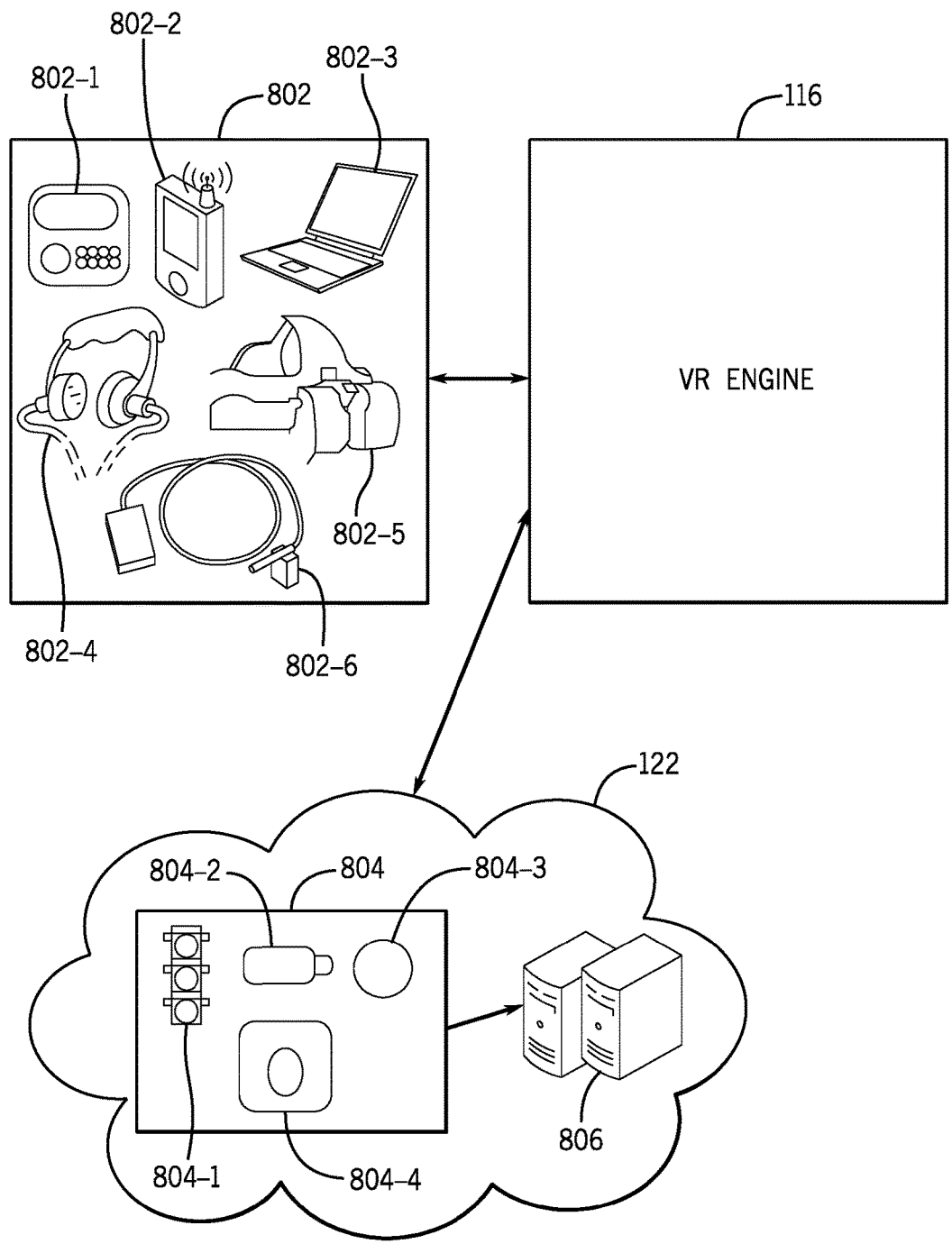
FIG. 8 is a schematic view of exemplary data sources that can obtain and transmit data to the VR Engine of FIG. 1 according to one aspect of the present disclosure.

The portable devices 124 and on-vehicle and off-vehicle devices will now be described in more detail with reference to FIG. 8. FIG. 8 is a schematic view of exemplary data sources (e.g., on-vehicle devices and off-vehicle devices) that can obtain and transmit data to the VR Engine 116 of FIG. 1 according to one embodiment. As mentioned above, portable devices 124 as on-vehicle devices provide input and/or output, including data (e.g., vehicle data, user data, other data (FIG. 3)), with the VR engine 116. The one-vehicle devices are associated with the vehicle (e.g., implemented within the vehicle) and/or a vehicle occupant of the vehicle. In FIG. 8, on-vehicle devices 802 can include a number of data collection sensors on-board the vehicle including, but not limited to, a vehicle computing device and/or vehicle display 802-1, a mobile device 802-2, a computer 802-3, headphones 802-4, a head mounted display (HMD) unit 802-5, and a virtual reality tracking device 802-6. The on-vehicle devices 802 are operably connected for computer communication with the VR Engine 116 to transmit and receive data collected by the on-vehicle devices 802. The connection can be facilitated, in some embodiments, by the I/O interface 112 and/or the network 122.

As mentioned above, portable devices 124 as off-vehicle devices provide input and/or output, including data (e.g., vehicle data, user data, other data (FIG. 3)), with the VR engine 116. In particular, off-vehicle devices obtain data externally from the vehicle. For example, the data can include data about the external environment of the vehicle. The data can be in different forms, for example, optical data (e.g., image, video), or quantitative data, among others. Examples of types of vehicle data that can be obtained by off-vehicle devices includes, but it's not limited to, data about the vehicle, other vehicles and/or objects (e.g., pedestrians) in the vehicle environment, for example, speed, acceleration, position, orientation, among others. Further, the data can include ambient environmental data, for example, temperature, humidity, light, weather conditions (e.g., rain, snow), among others.

In FIG. 8, the off-vehicle devices 804 can include, but are not limited to, 804-1 traffic light sensors, optical sensors 804-2 (e.g., mounted to a stationary object or road side object), in-road loop antennas and/or sensors 804-3, and external vehicle sensors and/or in-vehicle road sensors 804-4. In some embodiments, the data from the off-vehicle devices 804 are aggregated and stored at a data store 806. In other embodiments, the data from the off-vehicle devices 804 are transmitted directly to the VR engine 116. In one embodiment, the network 122 facilitates the communication of data between the off-vehicle devices 804, the data store 806 and the VR engine 116.

It is appreciated that the on-vehicle devices 802 and the off-vehicle devices 804 can comprise a network of sensors and the VR engine 116 can fuse data from the on-vehicle devices 802 and the off-vehicle devices 804, alone or in combination, to facilitated the systems and methods for in-vehicle dynamic virtual reality described herein.

A. Vehicle Implementation

The system of FIG. 1 will now be described as implemented within a vehicle 200 in FIG. 2. FIG. 2 is a schematic view of an exemplary vehicle and exemplary vehicle occupants implementing in-vehicle virtual reality systems and methods according to one or more aspects. In the examples that follow, it will be appreciated that the portable devices can be used in various combinations and located in other areas of the vehicle 200. In one example, the portable device 124 is a head mounted display (HMD), that can be placed on a user's body (e.g., head) or attached on a helmet or goggles. For example, referring to FIG. 2, a vehicle occupant 202, positioned in a seat 204 of the vehicle 200, is wearing an HMD 206 placed on the head of the vehicle occupant 202. The HMD 206 can provide information about the vehicle occupant 202, for example, tracking information, input information, motion information, among others to the VR engine 116. The HMD 206 can also act as an output device to provide a virtual view generated by the VR engine 116 to the vehicle occupant 202. In the embodiment, of FIG. 2, the HMD 206 is an on-vehicle device, however, it is appreciated, that in other embodiments, the HMD 206 could be implemented in another vehicle (i.e., not the vehicle 200) as an off-vehicle device, and could provide data to the VR engine 116, via, for example, the network 122 (e.g., a V2V network).

In another embodiment, the vehicle occupant 202 is in possession of a tablet 208 (e.g., a portable device). The tablet 208 can provide information about the vehicle occupant 202, for example, tracking information, input information, motion information, among others to the VR engine 116. For example, in one embodiment, the tablet 208 could include position and motion sensors. In other embodiments, the tablet 208 can also act as an output device to provide a virtual view generated by the VR engine 116 to the vehicle occupant 202. It is appreciated that the HMD 206 alone or in combination with the tablet 208 can provide information about the vehicle occupant 202 and provide a virtual view generated by the VR engine 116. It is also appreciated that the tablet 208 could be implemented in another vehicle (i.e., not the vehicle 200) as an off-vehicle device, and could provide data to the VR engine 116, via, for example, the network 122 (e.g., a V2V network).

In another embodiment, a vehicle occupant 210, for example, positioned in a back seat 212 of the vehicle 200, can be in possession of a portable device 214. In this embodiment, the portable device 214 can be a tablet, similar to the tablet 208. The portable device 214 can, in one embodiment, provide information about the vehicle occupant 210, for example, tracking information, input information, motion information, among others to the VR engine 116. The portable device 214 can also act as an output device to provide a virtual view generated by the VR engine 116 to the vehicle occupant 210. It is also appreciated that the portable device 214 could be implemented in another vehicle (i.e., not the vehicle 200) as an off-vehicle device, and could provide data to the VR engine 116, via, for example, the network 122 (e.g., a V2V network).

In a further embodiment, the vehicle occupant 210 can also be associated with a portable device 216. The portable device 216 can, in one embodiment, provide information about the vehicle occupant 210, for example, tracking information, input information, motion information, among others to the VR engine 116. Further, in some embodiments, the portable device 216 could obtain vehicle data from a source external from the vehicle 200. It is understood that the portable device 216 can be located, attached and/or positioned in various areas of the vehicle 200. Moreover, it is appreciated that the portable device 214 alone or in combination with the portable device 216 can provide information about the vehicle occupant 210 and provide a virtual view generated by the VR engine 116. Further, it appreciated that the portable device 216 could be implemented in another vehicle (i.e., not the vehicle 200) as an off-vehicle device, and could provide data to the VR engine 116, via, for example, the network 122 (e.g., a V2V network).

Figure 9A:
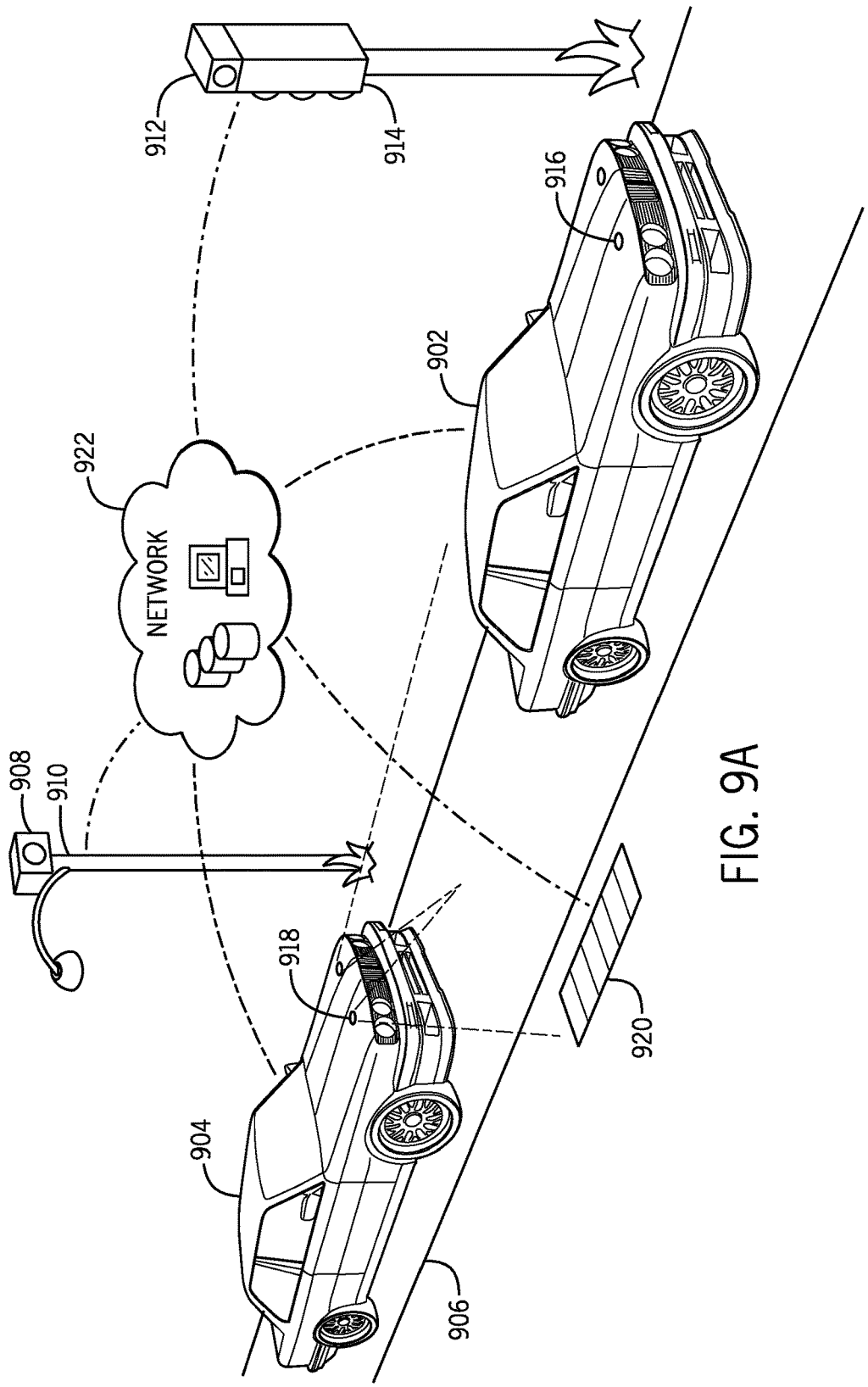
FIG. 9A is an illustrative example of an exemplary vehicle and portable devices obtaining vehicle data externally from the vehicle according to one aspect of the present disclosure.

In the embodiment described in FIG. 2, the portable devices are on-vehicle devices, however, it is appreciated that the portable devices can also be off-vehicle devices. Exemplary embodiments of off-vehicle devices implemented in a vehicle environment will now be described. FIG. 9A is an illustrative example of an exemplary vehicle and portable devices (e.g., off-vehicle devices) obtaining vehicle data externally from the vehicle according to one aspect. In particular, FIG. 9A includes a vehicle 902 (e.g., a host vehicle, the vehicle 200 of FIG. 2) and a second vehicle 904 driving along a road 906. In FIG. 9A, the off-vehicle devices can include, but are not limited to, an imaging unit 908 mounted to a street light 910, an imaging unit 912 mounted to a traffic light 914, external vehicle sensors 916 mounted to the vehicle 902, external vehicle sensors 918 mounted to a second vehicle 904, and in-road sensors 920. It is appreciated that other types of sensors and other types of off-vehicle devices can be implemented in different configurations and locations.

The off-vehicle devices of FIG. 9A obtain vehicle data externally from the vehicle 902. The vehicle data can include data about the external environment of the vehicle 902. In one embodiment, the off-vehicle devices of FIG. 9A communicate data to a network 922 (e.g., the network 122 of FIG. 1). The network 922 can communicate said data to the vehicle computing device 102 and/or the VR engine 116 of FIG. 1.

Illustrative examples of types of data that can be obtained from the off-vehicle devices of FIG. 9A will now be discussed. For example, the imaging units 908 and 912 can obtain images and/or video of the vehicle 902 and/or the second vehicle 904 as said vehicles pass by the street light 910 and/or the traffic light 914. The images can be used to determine speed and/or acceleration of the vehicle 902, the vehicle 904 and/or the speed and/or acceleration of the vehicle 902 in relation to the vehicle 904. The images can also be used to determine a location of the vehicle 902 and/or the second vehicle 904. The in-road sensors 920 can be used to measure or determine speed and/or acceleration of the vehicle 902, the vehicle 904 and/or the speed and/or acceleration of the vehicle 902 in relation to the vehicle 904. The in-road sensors 920 could also be used to measure a condition of the road 906, for example, a wet condition, an icy condition, among others. The data obtained from the off-vehicle devices of FIG. 9A can be used to determine vehicle motion data and augment and/or generate a virtual view based on the vehicle motion data.

Figure 9B:
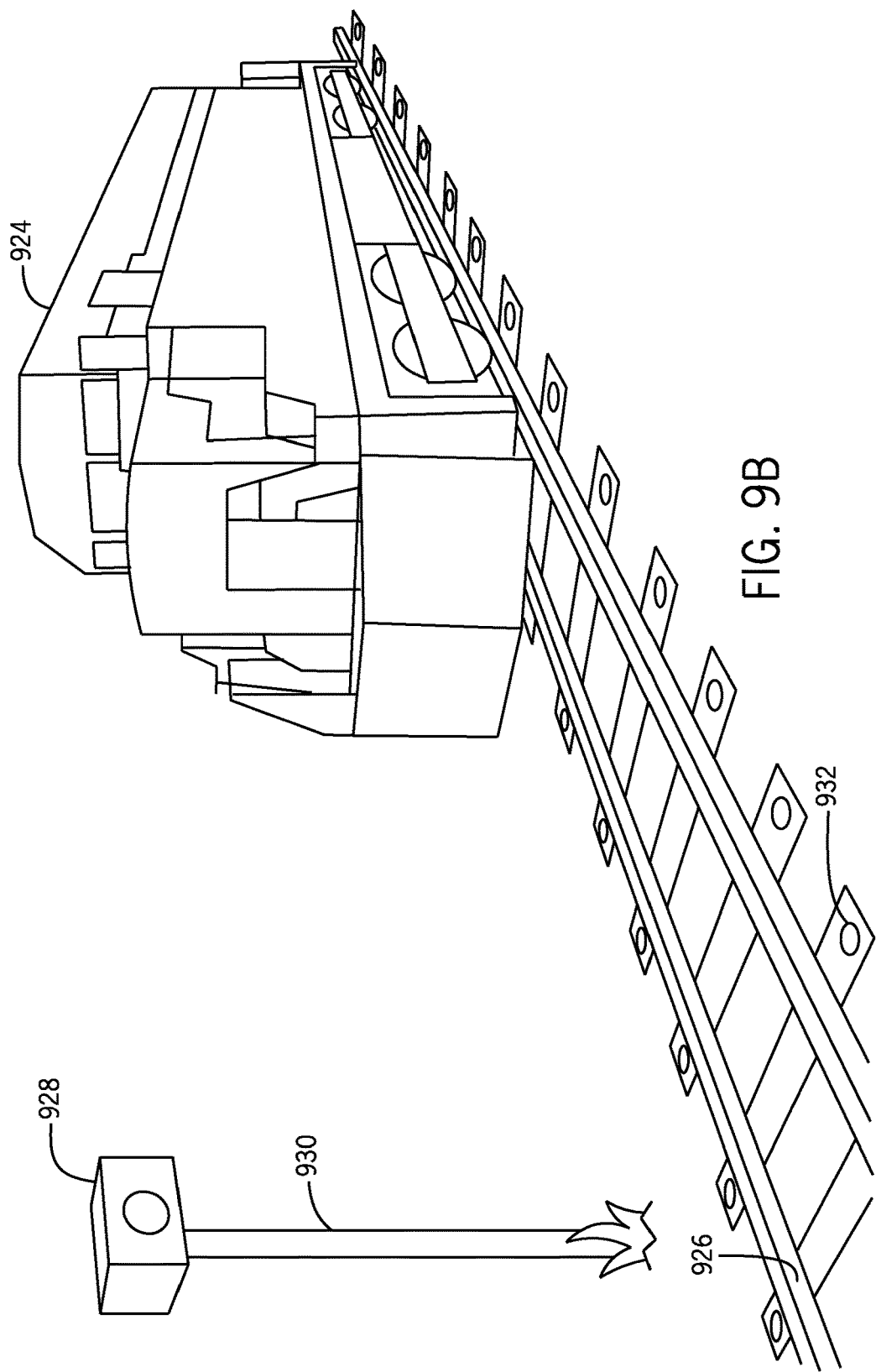
FIG. 9B is another illustrative example of an exemplary vehicle and portable devices obtaining vehicle data externally from the vehicle according to one aspect of the present disclosure.

FIG. 9B is another illustrative example of an exemplary vehicle and portable devices (e.g., off-vehicle devices) obtaining vehicle data externally from the vehicle according to one aspect of the present disclosure. In this embodiment, the vehicle 924 is a vehicle on a predetermined path, for example, a train, a roller coaster. It is appreciated, that in some embodiments, the vehicle 902 in FIG. 9A could also be a vehicle on a predetermined path, for example an autonomous vehicle. In FIG. 9B, the predetermined path can be, for example, tracks 926. In FIG. 9B, the off-vehicle devices can include, but are not limited to, an imaging unit 928 mounted to a stationary structure 930 and in-track sensors 932. It is appreciated that other types of sensors and other types of off-vehicle devices can be implemented in different configurations and locations. In some embodiments, a network (e.g., similar to the network 922) can be used to communicate data between the off-vehicle devices and the vehicle computing device 102 and/or the VR engine 116 of FIG. 1.

Illustrative examples of types of data that can be obtained from the off-vehicle devices of FIG. 9B will now be discussed. For example, the imaging unit 928 can obtain images and/or video of the vehicle 924 as said vehicle passes by the stationary structure 930. The images can be used to determine speed and/or acceleration of the vehicle 924. The images can also be used to determine a location of the vehicle 924. The in-track sensors 932 can be used to measure or determine speed and/or acceleration of the vehicle 924. The in-track sensors 932 could also be used to measure a condition of the tracks 926, for example, a wet condition, an icy condition, among others. Further, the in-track sensors and/or the imaging unit 928 can be used to obtain and/or determine a pre-determined path (e.g., the path of the tracks 926, the route of the vehicle 924) of the vehicle 924 or a current location of the vehicle 924 on the predetermined path. In other embodiments, the predetermined path can be obtained from an on-vehicle device, for example, a navigation unit, an electronic control unit, a processor (e.g., the processor 104). In the case of an autonomous vehicle, the predetermined path could be obtained from an on-vehicle device such a navigation unit and/or an external source accessed via the network 122 of FIG. 1. The data obtained from the off-vehicle devices of FIG. 9B can be used to determine vehicle motion data and augment and/or generate a virtual view based on the vehicle motion data.

B. Virtual Reality Engine

Figure 3:
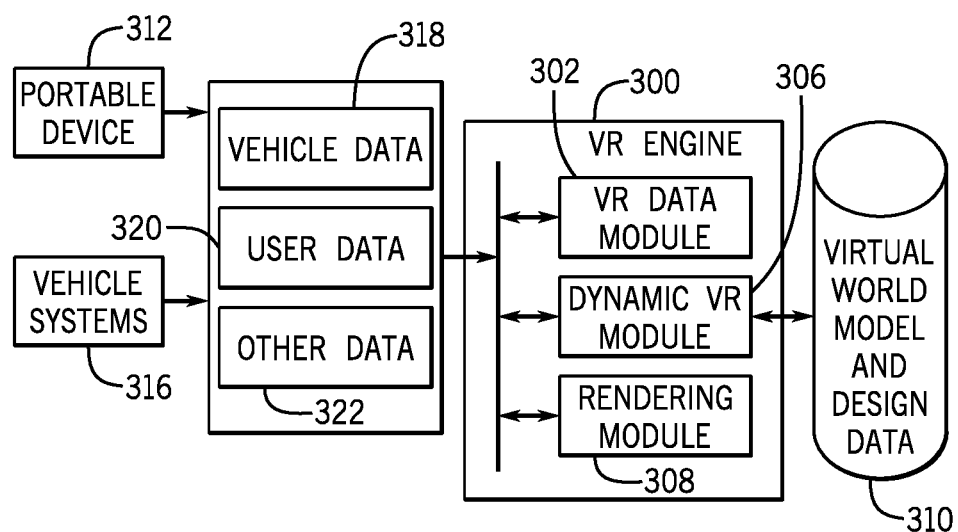
FIG. 3 is a block diagram of the exemplary virtual reality engine of FIG. 1 according to one aspect of the present disclosure.

The VR engine 116 of FIG. 1 and a system for in-vehicle dynamic virtual reality will now be discussed in detail with reference to FIGS. 1, 2 and 3. FIG. 3 illustrates a block diagram of a virtual reality (VR) engine 300 (e.g., the VR engine 116) according to an exemplary embodiment. For simplicity, not all components of FIG. 1 are shown in FIG. 3. The VR engine 300 includes a virtual reality data module 302, a dynamic virtual reality (VR) module 306 and a rendering module 308. In addition to the functionality described above with reference to FIG. 1, the aforementioned modules can access and/or receive vehicle data 318, user data 320 and other data 322, as well as communicate with a portable device 312 (e.g., the portable device 124) (e.g., the I/O device 126) and vehicle systems 316 (e.g., the vehicle systems 118). As discussed above, the portable device 312 can provide input and/or output to the VR engine 300. Further, the portable device 312 can provide output to a user (e.g., a vehicle occupant 202, 210).

In one embodiment, the virtual reality data module 302 receives vehicle data from the one or more vehicle systems 316 (e.g., the vehicle systems 118) of a vehicle. For example, the vehicle data 318 can include vehicle data metrics and parameters derived from the vehicle systems 118 and/or the vehicle sensors 120. In another embodiment, the portable device 312 can include one or more on-vehicle devices and/or one or more off-vehicle devices. The off-vehicle devices, as described above with reference to FIGS. 8, 9A and 9B, obtain vehicle data externally from the vehicle. In particular, the vehicle data can include data about the external environment of the vehicle.

In a further embodiment, the virtual reality data module 302 receives vehicle data from a portable device 312. In this embodiment, the portable device 312 can obtain the vehicle data independently from the vehicle (i.e., without directly connecting and/or receiving data from the bus 114 (e.g., a vehicle CAN bus), the vehicle systems 118, and/or the vehicle sensors 120). For example, the portable device 312 can include position and motion sensors. The portable device 312 can gather vehicle data utilizing the position and motion sensors. In one embodiment, the portable device 312 is operably connected for computer communication to an output device.

The vehicle data includes vehicle dynamics data of the vehicle. The vehicle data 318 includes vehicle data metrics and parameters derived from the vehicle sensors 120. For example, vehicle data can include, but is not limited to, vehicle location data, vehicle orientation data, vehicle system state data, data related to one or more vehicle systems and/or components, vehicle environment data (e.g., interior and exterior environment data) among others. The vehicle data 318 can also include navigation data, for example, location data, direction data (e.g., origin, destination, point of interest), a predetermined path of the vehicle, among others.

The vehicle data 318 can also include vehicle dynamics data that describes the dynamics of the vehicle and the motion of vehicle (e.g., velocity, direction, acceleration, yaw rate, steering rate, steering angles). Vehicle dynamics data can include, but is not limited to, real time data concerning the speed level, the acceleration rate, the yaw rate, the steering wheel position, the brake position, the throttle position, the transmission gear position of the vehicle, driver commands, dynamic car responses, tire and road forces, among others. Further, vehicle dynamics data can include derivatives of said data.

In some embodiments, the vehicle data 318 can be received from remote sources, for example, the network 122 and/or off-vehicle devices. In one embodiment, the VR data module 302 can receive predictive vehicle data or can determine predictive vehicle data based on the vehicle data 318 and/or the vehicle dynamics data. For example, vehicle predictive motion data can be based on pedal positions, vehicle system status/control, current vehicle location, vehicle destination information, among others. As an illustrative example, the position of the accelerator pedal of the vehicle and the time delay between pedal positions can be modeled with a dynamic model of the vehicle to determine vehicle predictive motion data. In another example, information from the accelerator pedal and traffic information (e.g., received from an off-vehicle device indicating a traffic light turning green) can be used to determine vehicle predictive motion data.

The virtual reality data module 306 also receives user data 320. For example, the user data 320 can be received from one or more of the portable devices 312. The user data 320 includes tracking data, interaction data, user input data, among others. The user data can be based at least in part, on data from vision sensors (e.g., vehicle sensors 120, cameras, gesture/motion sensors), tracking systems, the portable device 312, the I/O device 312, and other sensors and systems that provide data about the user's interaction, position, orientation, location and motion. For example, the user data 320 can include position, orientation and location information about the user. In another embodiment, the user data 320 can include position, orientation and location information about the user in relation to the vehicle, for example, based in least in part, on the vehicle data 318 (including the vehicle dynamics data). Thus, in one embodiment, the user data 320 can provide information on the user's motion and position and how the user's motion and position is affected by the vehicle dynamics. The user data can also include health data about the user, for example, from health monitoring devices (e.g., portable medical devices worn by the user, wearable computing devices, in-vehicle biological health monitoring devices). In some embodiments, the user data can also be received from other networks 122 and/or the vehicle systems 316.

In another embodiment, the virtual reality data module 302 also receives other data for facilitating dynamic in-vehicle virtual reality. The other data 322 can include can include big data from the vehicle systems 316, the portable device 312, and/or other networks 122. For example, other data 322 can include environmental data associated with the vehicle (e.g., interior, exterior), road conditions (e.g., bumpy roads, slick roads, traffic conditions), weather conditions, vehicle temperature, among others. In another embodiment, the other data 322 can include driver action data, for example, driving history, fuel efficiency, interactions with other vehicle systems, gestures, motion relative to the vehicle, among others. Further, in some embodiments, the other data 322 can include social media data from, for example, the other networks 122.

The dynamic VR data module 306 generates a virtual view based on the vehicle data, the user data and a virtual world model. In one embodiment, a data store stores a virtual world model, the virtual world model including one or more components that define the virtual view. For example, in FIG. 3, a data store 310 can store a virtual world model and design data. The virtual world model and design data can include game themes, software or program instructions to define and generate a virtual world and/or a virtual view. In another embodiment, the memory 106 and/or the disk 108 can store some or all of the aforementioned virtual world model and design data. In another embodiment, the virtual world model and design data is received from remote sources, for example, the network 122.

Figure 4:
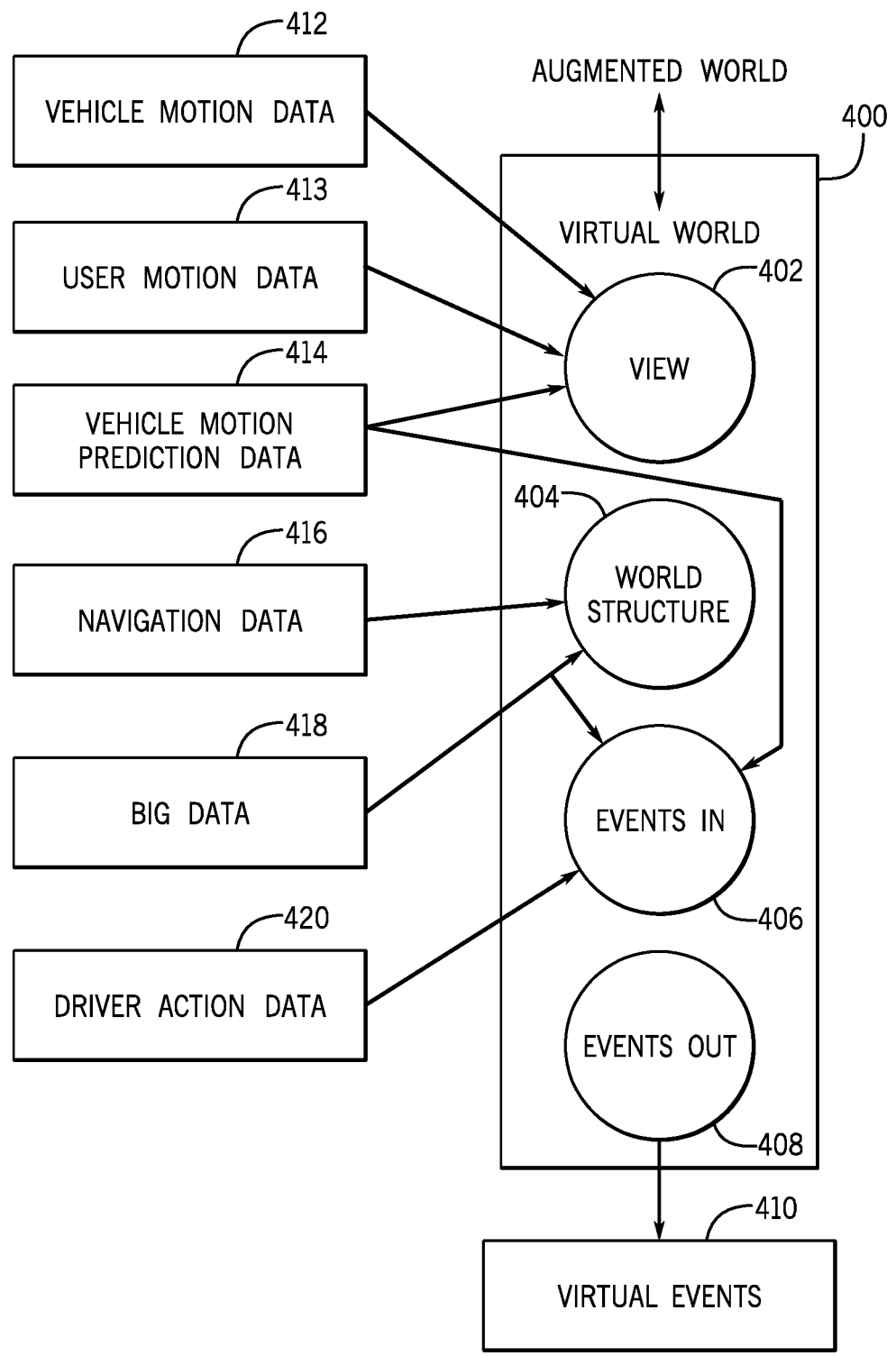
FIG. 4 is an exemplary virtual world model diagram including data flow according to one aspect of the present disclosure.
Figure 5:
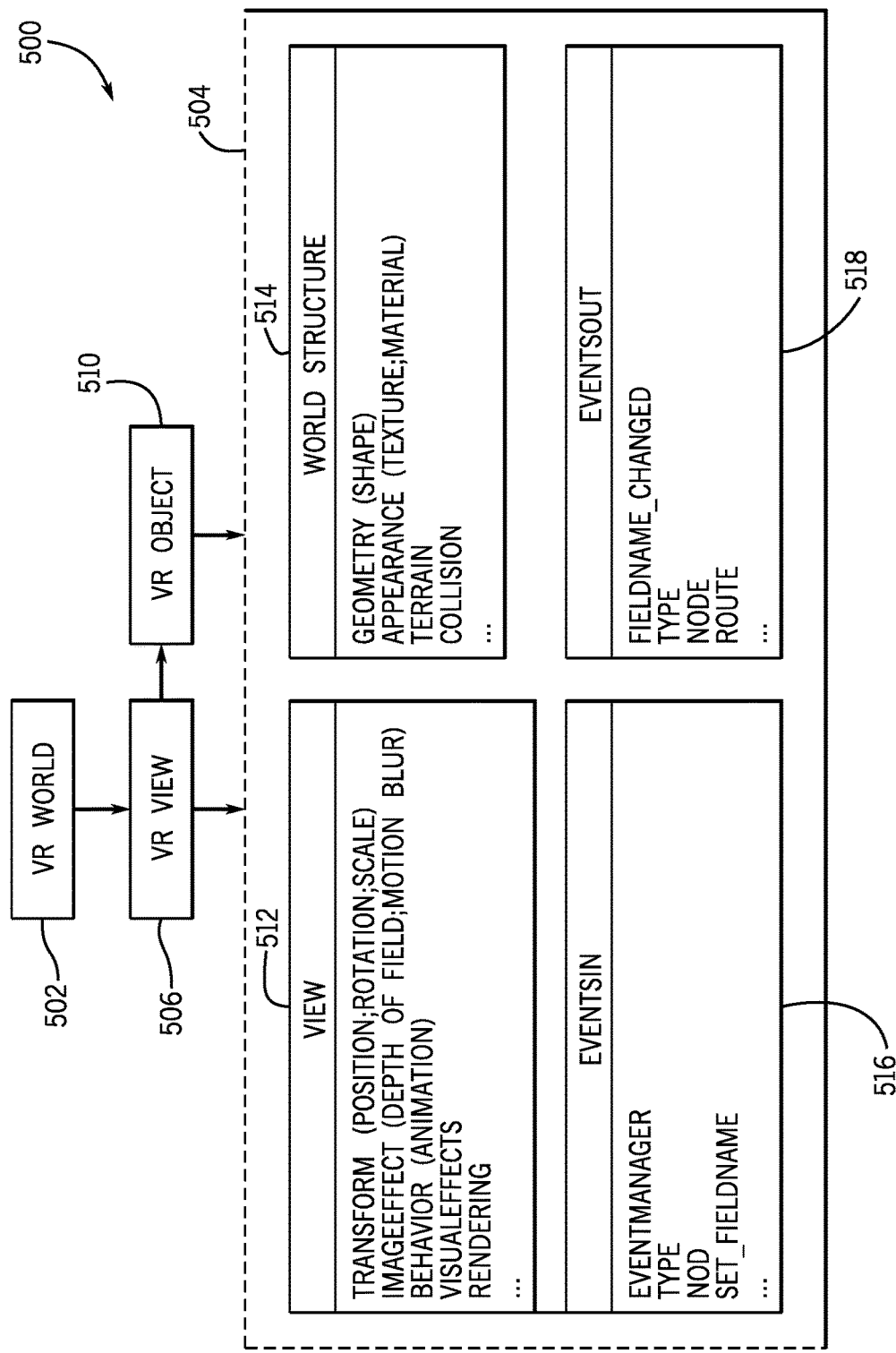
FIG. 5 is an exemplary schematic class diagram of a virtual reality world including the virtual world model of FIG. 4 according to one aspect of the present disclosure.

An exemplary virtual world model will now be described with reference to FIGS. 4 and 5. FIG. 4 illustrates an exemplary virtual world data model 400 diagram including data flow according to an exemplary embodiment. FIG. 5 is a schematic class diagram 500 of a virtual reality world 502 including a group of node classes 504 of the virtual world model of FIG. 4 according to an exemplary embodiment. The node classes, objects, properties, references, methods and events (i.e., the one or more components that define the virtual view) discussed with FIGS. 4 and 5 are exemplary in nature and are not intended to be limiting. Generally, a virtual world model is a collection of many individual operations and objects that define the virtual world and one or more virtual views. The virtual world model can be defined in various modeling and programming languages, for example, virtual reality modeling language (VRML), DirectX, OpenGL, Unity, among others. As illustrated in FIG. 5, the virtual world 502 can include one or more virtual views 506. The virtual world 502 and the virtual view 506 can also include one or more virtual objects 510. The virtual view 506 and the virtual object 510 are defined by node classes, and in the example of FIG. 5, the group of node classes 504. In some embodiments, nodes can be grouped and applied to one or more virtual views 506 and/or virtual objects 510 in a hierarchy structure. For example, the group of node classes 504 can apply to parent and child nodes of the virtual views 506 and/or virtual objects 510 associated with a particular group of nodes (i.e., the group of node classes 504).

In the illustrated embodiment of FIG. 5, the group of node classes 504 includes a view node class 512, a world structure node class 514, an eventsIn node class 516 and an eventsOut node class 518. Each node class can include components that define and/or modify the node classes, for example, other nodes, properties, fields, methods and/or references. In some embodiments, the nodes, properties, fields, methods and/or references can be predefined based on the virtual world, for example, for a particular theme, game, among others. Additionally, in some embodiments, the nodes, properties, fields, methods and/or references can be predefined based on the user, for example, based on user preferences. Other node classes, properties, fields, methods and/or references not included in FIGS. 4 and 5 can be implemented and may be based on the different modeling and programming languages mentioned above.

The group of node classes 504 of FIG. 5 will now be discussed in detail. The view node class 512 defines the position and/or the orientation of the virtual view 506, the virtual object 510 and/or operations associated with the virtual view 506 and/or the virtual object 510. For example, in FIG. 5, the transform node can be used to perform geometric transformations and includes the properties position, rotation and scale. The imageEffect node handles image post processing effects. Exemplary image post processing effects include, depth of field, motion and blur, among others. The behavior node can be used to enable and disable different behaviors, for example, animation and motion. The visualEffects node can be used to define visual effects, for example, line renderers, halo effects, trail renders, among others. The rendering node can be used to define settings and components for rendering in-game and user interface elements.

The world structure class node 514 defines the structure and appearance of the virtual view 506, the virtual object 510 and/or operations associated with the virtual view 506 and/or the virtual object 510. For example, the geometry node can be used to define shapes. The appearance node can be used to define texture and material. The terrain node can be used to define aspects of a terrain and landscape. The collision node defines which objects in a virtual view are collidable.

The eventsIn class node 516 defines the types and names of events that each node can receive or generate. For example, the EventManager node can define custom events and includes event handlers and listeners that determine event triggers (e.g., determined from user data (e.g., user input), vehicle data) to initialize specific events. The type field defines a type of the event, the node field defines which node(s) the event applies to and the set_fieldname method can be used to modify a value of a field during the event. The eventsOut class node 518 manages execution and routing of the event. The fieldname_changed field indicates what field (s) are changed during the event, the type field defines the type of the event, the node field can define which node the event applies to and the route method defines how the event is sent to a node and how the event is received and generated by a node. Again, the class nodes and components in FIG. 5 are exemplary in nature and other class nodes and components can be implemented with the systems and methods discussed herein. The class nodes and components can be augmented according to at least one of the vehicle data and the user data to generate a dynamic virtual world and/or virtual views to a user. Specifically, the vehicle data and the user data can be used to initialize nodes, set properties and fields and initialize or define events.

Referring again to FIG. 4, the model 400 includes, one or more components that define a virtual view. For example, in FIG. 4, the model includes a view class node 402, a world structure class node 404, an eventsIn class node 406 and an eventsOut class node 408. The class nodes in FIG. 4 can include similar methods, properties, fields and references as the class nodes described with FIG. 5. FIG. 4 also illustrates exemplary data flow to the class nodes, for example, for augmenting the class nodes. Specifically, the dynamic VR module 306 can use these types of data to augment specific class nodes. As discussed in FIG. 3, the data can include vehicle data 318, user data 320 and/or other data 322. The types of data illustrated in FIG. 4 are types of vehicle data 318, user data 320 and/or other data 322 in FIG. 3. Specifically, in FIG. 4, the data includes, but is not limited to, vehicle motion data (including vehicle dynamics data) 412, user motion data 413, vehicle motion predictive data 414, navigation data 416, big data 418 and driver action data 412.

Referring again to FIG. 3, the dynamic VR module 306 modifies and/or augments one or more components of the virtual world model 400 based on at least one of the vehicle data and the user data. As shown in FIG. 4, the arrows illustrate the flow from the different types of data to the VR model components. Accordingly, the arrows illustrate exemplary flow of data that can be used to augment specific VR model components. For example, vehicle motion data 412 (e.g., vehicle dynamics data, vehicle velocity, direction, acceleration, jerk, vehicle occupant motion data) can be used to augment components of the view class node 402. User motion data 413 (e.g., position, orientation, location, input) can be used to augmented components of the view class node 402. Further vehicle motion predictive data 414 (e.g., pedal positions, auto cruise control) can also be used to augment the view class node 402. In another embodiment, the navigation data 416 (e.g., navigation location, directions) can be used to augment the world structure class node 404. The big data 418 (e.g., speed bumps, road conditions, steering conditions) can also be used to augment the world structure class node 404. Further, the big data 418 can be used to augment the eventsIn class node 406. The driver action data 420 (e.g., fuel efficiency, driver input, audio) can also be used to augment the eventsIn class node 406.

As discussed above, the view class node 402, the world structure class node 404, the eventsIn class node 406 and the eventsOut class node 408 define the virtual view and can be augmented using at least one of vehicle data and user data to provide a dynamic virtual view to a user. In particular, the data types in FIG. 4, can be used to augment the components of the virtual world model 400 thereby generating a virtual view that can include one or more virtual events 410. In one embodiment, the dynamic VR model 306 augments one or more properties of the one or more components of the virtual world model based on the vehicle data and the user data. For example, the one or more properties of the one or more components can include those properties of the class nodes illustrated in FIG. 5. In one embodiment, one or more of the properties can include a motion property defining a motion of the component. For example, the view class node 402 can include a property, for example, transform class node that defines the position, the rotation and or the scale of an object. Based on at least one of the vehicle data and the user data, the transform class node can be augmented to change the position, rotation and or scale of the object. As an illustrative example, and referring to FIGS. 4 and 5, a VR object 510 can be defined as a ball (i.e., defined by the world structure class node 514, for example, the geometry class node). The vehicle motion data 412 (e.g., vehicle dynamics data) can be used to augment a feature of the ball. For example, using the view class node 402 and the transform class node, the position, rotation and/or the scale of the ball can be set based on the vehicle motion data 412. Accordingly, the VR object 510, (i.e., the ball) is synchronized with the vehicle motion data 412.

Referring again to FIG. 3, the rendering module 308 renders the virtual view from the dynamic VR module 306 to an output device by controlling the output device to update display of the virtual view according to the vehicle dynamics data. For example, the dynamic reality module 306 renders the virtual view to an output device, which can be a portable device 312, for example a vehicle display, a HMD, among others. In one embodiment, the rendering module 308 determines vehicle motion data 412 based on the vehicle dynamics data (i.e., the vehicle data 318). The rendering module 308 can also determine user motion data 412 representing motion of the user relative to the vehicle based on the user data 320 and the vehicle data 318. For example, in one embodiment, the portable device 312 can include accelerometer sensors and/or gyroscope sensors that help determine a position, a location and/or an orientation of the user in relation to the vehicle. The vehicle motion data 412 and/or the user motion data 412 can be used to augment one or more components of the virtual world model 400, thereby controlling the output device to update display of the virtual view according to the vehicle dynamics data. In another embodiment, the rendering module 308 can augment the rendering speed (e.g., the frames per second, frame rate, frame update rate defined and implemented by the graphics rendering hardware/software) of the output device directly based on the vehicle motion data 412 and/or the user motion data 412.

In a further embodiment, the rendering module 308 determines a temporal-motion rendering speed based on the vehicle motion data and the user motion data. The temporal-motion rendering speed is a correlation between the vehicle motion data and the user motion data. In another embodiment, the temporal-motion rendering speed also considers a time component from the vehicle data. The temporal-motion rendering speed is a post image processing and rendering property (e.g., frames per second, frame rate, frame update rate) that minimizes the difference between the vehicle motion data and the user motion data. The rendering module 308 can render the virtual view to the output device by controlling the output device to update display of the virtual view based on the temporal-motion rendering speed. For example, the rendering speed (e.g., the frames per second, frame rate, frame update rate) implemented by the graphics hardware and/or software of the I/O device 316 can be augmented based on the temporal-motion rendering speed. In another embodiment, the dynamic VR module 306 augments one or more properties of the one or more component of the virtual world model based on the temporal-motion rendering speed. For example, the view class node 402 can include a rendering properties and/or properties related to motion (See FIG. 5). In one embodiment, these properties can include frames per second, frame rate and/or a frame update rate.

By updating the virtual view according to the vehicle dynamics data in real-time, the virtual view presented to the user is dynamic and considers the vehicle motion and the user motion, thereby simulating the vehicle motion and the user motion in the virtual view in real-time. Said differently, one or more components of the virtual world model are synchronized based on at least the vehicle data and the user data, including the vehicle dynamics data and the user motion data. Not only does this provide a truly immersive virtual reality environment for the user, but virtual reality motion sickness can be minimized, because the virtual view considers vehicle dynamics and user motion.

II. Exemplary Methods for Dynamic in-Vehicle Virtual Reality

Figure 6:
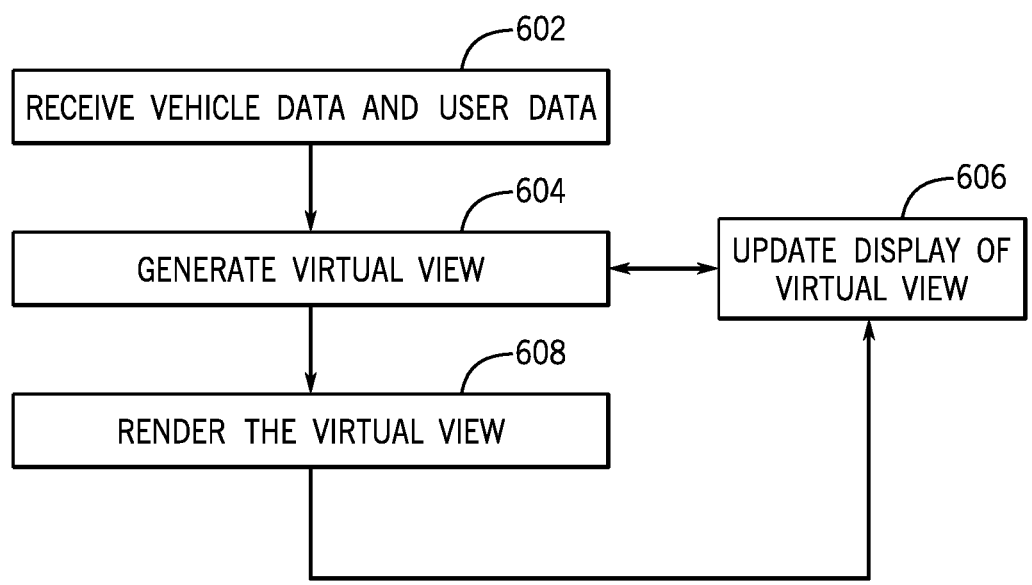
FIG. 6 is a flow chart diagram of an exemplary method for dynamic in-vehicle virtual reality according to one aspect of the present disclosure.

The dynamic in-vehicle virtual reality system illustrated in FIGS. 1-5, 8, 9A and 9B described above will now be described in operation with reference to a method of FIG. 6. It will be appreciated that the systems and components discussed above with references to FIGS. 1-5 can similarly be implemented with the method of FIG. 6. The method of FIG. 6 includes at block 602, receiving vehicle data and user data from one or more portable devices, wherein the vehicle data comprises vehicle dynamics data of the vehicle. For example, referring to FIG. 3, the VR data module 302 can receive vehicle data 318. The vehicle data 318 can include vehicle dynamics data. In one embodiment the vehicle data 318 is recieved from one or more portable devices 312 (e.g., on-vehicle devices and/or off-vehicle devices). In another embodiment, the vehicle data 318 is recieved from one or more vehicle systems 316. The VR data module 302 can also receive user data 320 from one or more portable devices 312 (e.g., on-vehicle devices and/or off-vehicle devices). In another embodiment, the use data 320 is received from vehicle systems 316.

In one embodiment, the portable device is an off-vehicle device that obtains the vehicle data externally from the vehicle. For example, the off-vehicle devices 804 of FIG. 8. As an illustrative example, the off-vehicle device is an imaging unit mounted to a stationary structure external to the vehicle. The vehicle data can include data about the external environment of the vehicle.

Referring back to FIG. 6, at block 604, the method includes generating a virtual view based on the vehicle data, the user data and a virtual world model. The virtual world model includes one or more components that define the virtual view. FIG. 4 illustrates an exemplary virtual world model 400 diagram including data flow according to an exemplary embodiment. The virtual world model 400 includes one or more components that define the virtual view. For example, the view node class 402, the world structure node class 404, the events in node class 406 and the events out node class 408 are exemplary components that define the virtual view. In particular, these node classes define one or more virtual views and one or more virtual objects of the virtual world. The node classes can contain other nodes, properties, fields, methods and references (See FIG. 5).

In one embodiment, generating the virtual view includes augmenting one or more components of the virtual world model according to at least one of the vehicle data and the user data. For example, the view node class 402, the world structure node class 404, the events in node class 406 and the events out node class 408, and/or, nodes, properties, fields, methods and references associated with these nodes, can be augmented based on at least one of the vehicle data and the user data. In FIG. 4, the vehicle motion data 412, the user motion data 413, the vehicle motion prediction data 414, the navigation data 416, the big data 418 and the driver action data 420 are exemplary types of data that can be used to augment one or more of the components of the virtual world model 400.

In one embodiment, the method includes determining an orientation and a location of the vehicle based on the vehicle data. For example, navigation data 416 (e.g., from for example the GPS 110) can be used to determine the orientation and the location of the vehicle. The dynamic VR module 306 and/or the rendering module 308 can determine the orientation and the location of the vehicle based on the vehicle data 318. The method can also include determining an orientation and a location of the user relative to the vehicle based on the user data and the vehicle data. For example, the dynamic VR module 306 and/or the rendering module 308 can determine the orientation and the location of the user relative to the vehicle based on the user data 320 and the vehicle data 318. For example, the VR devices (e.g., tracking devices, the HMD 202, the portable device 208) can include sensors (e.g., accelerometers, gyroscopes, compasses) that provide user data for determining the orientation and the location of the user relative to the vehicle.

Augmenting one or more components of the virtual world model can be based on at least one of the orientation and the location of the vehicle and the orientation and the location of the user. As a non-limiting example, the dynamic VR module can augment the world structure class node 404, with the orientation and the location of the vehicle and the orientation and the location of the user in relation to the vehicle to provide real-time world structures. For example, the terrain class node (See FIG. 5) can be augmented to provide a terrain or landscape in the virtual view that includes a component based on the orientation and the location of the vehicle and the orientation and the location of the user in relation to the vehicle.

In another embodiment, one or more virtual events 410 can be augmented or created based on at least one of the vehicle data 318 and the user data 320. As an illustrative example, driver action data 420 can be used to augment the eventsIn class node 406. Driver action data 420, can include for example, driving history, fuel efficiency, interactions with other vehicle systems, gestures, motion relative to the vehicle, among others. As a non-limiting illustrative example, a user 312 (i.e., a vehicle occupant 202), may roll down a vehicle window (not shown). This driver action is determined based on vehicle data 318 from the vehicle systems 316 (e.g., power window vehicle system) and user data 320 from the VR devices 316 (e.g., tracking devices) indicating that the user 312 has rolled down the vehicle window. In response, the dynamic VR module 306 can augment, for example, the eventIn class node 406, to trigger an event in the virtual view associated with the user 312 rolling down the vehicle window. For example, a simulation of the wind from the vehicle window can be presented in the virtual view, among others. As another illustrative example, the dynamic VR module 306 can define the structure of the simulation of the wind based on a temperature determined from the vehicle data 318. For example, if the temperature is a certain degree, the simulation of the wind in the virtual view may include particles of snow. This can be defined by augmenting the eventsIn class node 406 of the world structure class node 404. The eventsOut node 408 can then route the event to create the virtual event 410.

In a further embodiment, the method includes determining vehicle motion data based on the vehicle dynamics data. The dynamic VR module 306 and/or the rendering module 308 can determine the vehicle motion data based on the vehicle data 318, which includes vehicle dynamics data. As discussed above, vehicle motion data 412 defines real-time motion of the vehicle. Further, the vehicle motion data can also include predictive vehicle motion data determined based on the vehicle data 318, the user data 320 and/or the other data 322. For example, the predictive vehicle motion data can be based on pedal positions, cruise control, destination information, among others.

In another embodiment, the vehicle motion data is based on vehicle data obtained from the off-vehicle devices. In a further embodiment, the vehicle motion data is based on a predetermined path of the vehicle. The predetermined path of the vehicle can be obtained from one or more portable devices 312, for example, road sensors (e.g., off-vehicle device), a navigation unit (e.g., an on-vehicle device), among others. In one embodiment, determining the vehicle motion data includes determining at least a velocity and an acceleration of the vehicle based on the predetermined path of the vehicle.

As an illustrative example, a vehicle with a predetermined path can be a roller coaster. In this example, information about the predetermined path and/or an initial set of conditions (e.g., physical dimensions of the track, hill height, number of loops, run time, angle of decent, track material type, mass, speed, force) can be obtained from the rollercoaster (e.g., an ECU) and/or sensors associated with the roller coaster, for example, sensors along the track of the roller coaster. Based on the initial set of conditions, velocity and acceleration can be calculated, for example, using Newton's second law, circular motion equations, among others.

As another illustrative example, a vehicle with a predetermined path can be a self-driving car (e.g., an autonomous vehicle), the path of which has already been determined and stored, for example, at the vehicle (e.g., the ECU, navigation device). The controls of the self-driving vehicle (e.g., steering angle, acceleration position) can serve as inputs to determine vehicle emotion data, for example, velocity and/or an acceleration of the vehicle.

In a further embodiment, the method can also include determining user motion data representing motion of the user relative to the vehicle based on the user data and the vehicle data. The user motion data can be based on the vehicle data and the user data 320 and can be determined by the dynamic VR module 306 and/or the rendering module 308.

Referring again to FIG. 6, at block 608 the method includes rendering the virtual view to an output device by controlling the output device to update the display of the virtual view according to the vehicle dynamics data. For example, the dynamic reality module 306 renders the virtual view to one or more of the VR devices 316 (i.e., the HMD 206, the portable device 208). In one embodiment, the rendering module 308 renders the virtual view to an output device by controlling the output device to update the display of the virtual view according to the vehicle motion data 412 and the user motion data 413. This can be accomplished, in one embodiment, by directly augmenting the rendering speed (e.g., the frames per second, frame rate, frame update rate) implemented by the graphics hardware and/or software of the portable devices 312. In another embodiment, shown at block 606, the dynamic VR module 306 augments one or more components of the virtual world model 400 according to the vehicle motion data 412 and the user motion data 413.

In another embodiment, the method includes determining a temporal-motion rendering speed based on the vehicle motion data and the user motion data. Rendering the virtual view can include controlling the output device to update display of the virtual view based on the temporal-motion rendering speed. The temporal-motion rendering speed is a correlation between the vehicle motion data 412 and the user motion data 413. In another embodiment, the temporal-motion rendering speed also considers a time component from the vehicle data. The temporal-motion rendering speed is a post image processing and rendering property (e.g., frames per second) that minimizes the difference between the vehicle motion data 412 and the user motion data 413. The rendering module 308 can render the virtual view to the output device by controlling the output device to update display of the virtual view based on the temporal-motion rendering speed. For example, the rendering speed (e.g., the frames per second, frame rate, frame update rate) implemented by the graphics hardware and/or software of the portable devices 312 can be augmented based on the temporal-motion rendering speed.

In a further embodiment, shown at block 606, the dynamic VR module 306 augments one or more properties of the one or more component of the virtual world model based on the temporal-motion rendering speed. For example, the view class node 402 can include a rendering properties and/or properties related to motion (See FIG. 5). In one embodiment, these properties can include frames per second, frame rate and/or a frame update rate. In this way, the virtual view presented to the user is dynamic and simulates the vehicle motion in real-time. Said differently, one or more components of the virtual world model are synchronized based on at least the vehicle data and the user data, including the vehicle dynamics data and the user motion data. Not only does this provide a truly immersive virtual reality environment for the user, but also virtual reality motion sickness can be minimized, because the virtual view considers the vehicle dynamics and the user motion. Further, each virtual view presented to the user can be updated and maintained based on the vehicle dynamics data. For example, if a virtual view presents user settings (i.e., not in a game play mode), the virtual view is always updated and maintained based on the vehicle dynamics data.

In some embodiments, virtual reality objects and/or operations can have predefined rendering speeds. As an illustrative example, certain objects or certain virtual worlds may be set to rendering speeds of 25 ms. This predefined rendering speed can be adjusted based on the vehicle dynamics data as discussed above. Thus, in some embodiments, the temporal-motion rendering speed can be based on a predefined rendering speed, vehicle motion and user motion. Further, the temporal-motion rendering speed can also consider other types of data based on the user. For example, as discussed above, other data 322 can include health data associated with the user 312. If for example, the health data indicates motion or sensory issues (e.g., disorientation, vertigo, motion sickness), the temporal-motion rendering speed can be adjusted based on the health data to minimize the motion or sensor issues.

III. Illustrative Examples

Figure 7A:
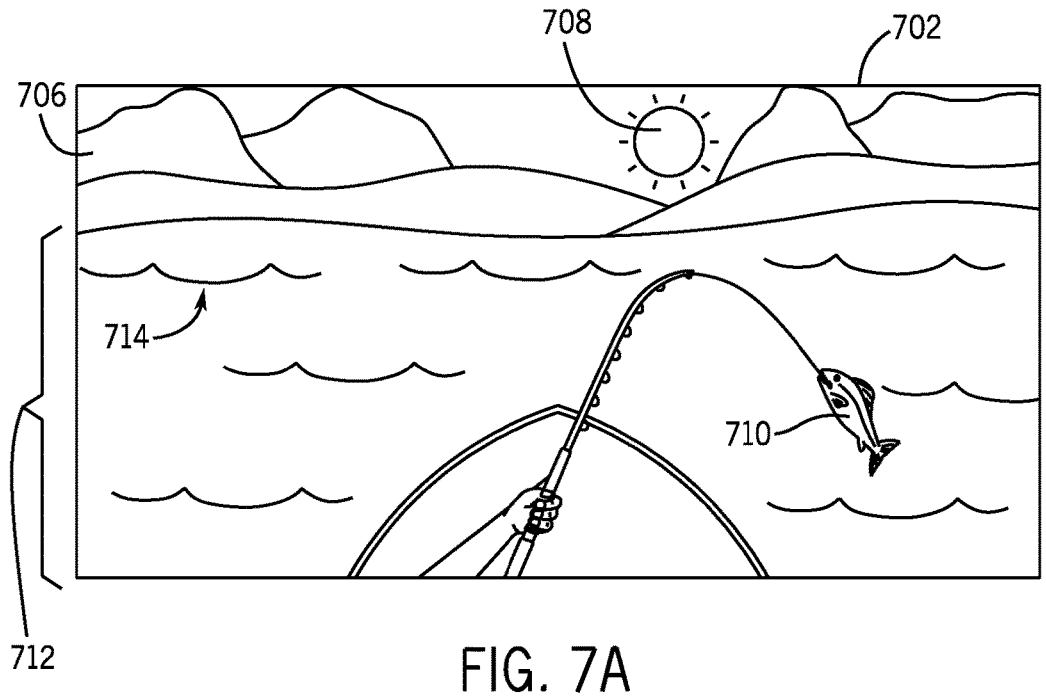
FIG. 7A is an illustrative example of an exemplary virtual view according to one aspect of the present disclosure.
Figure 7B:
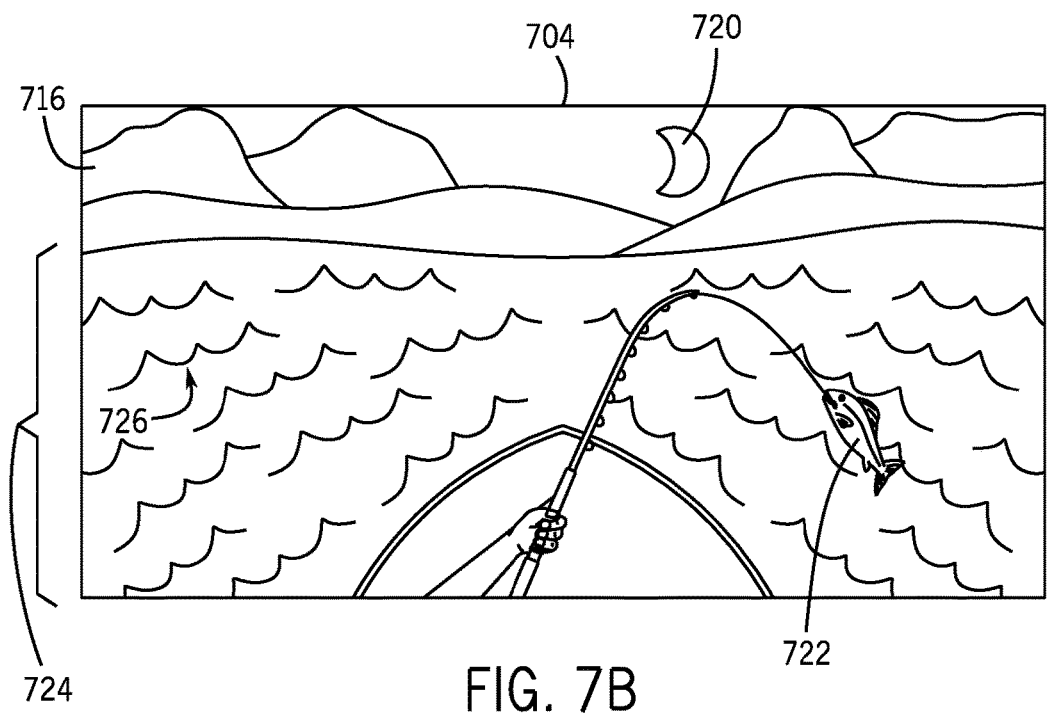
FIG. 7B is an illustrative example of another exemplary virtual view according to one aspect of the present disclosure.

Illustrative examples of dynamic virtual views generated by the methods and systems discussed herein will now be described with reference to FIGS. 7A and 7B. FIG. 7A illustrates a virtual view 702 and FIG. 7B illustrates a virtual view 704 from a fishing virtual reality game, the objects and operations of which are defined by a virtual world model, for example the virtual world model 400 of FIG. 4 and the schematic class diagram 500 of a virtual reality world of FIG. 5. Specifically, the virtual views 702, 704 are generated based on the vehicle data, the user data and the virtual world model, the virtual world model including one or more components that define the virtual views 702, 704. The virtual views 702, 704 can be displayed in one embodiment, on the output device 126 (FIG. 1). In another embodiment, the virtual views 702, 704 can be displayed on the portable device 124 (FIG. 1).

The virtual view 702 includes one or more virtual reality objects, including a landscape 706, a sun 708, a fish 710 and a water object 712. The water object 712 includes one or more waves 714. Again, the objects and operations of the virtual view 702 are defined by a virtual world model. One or more components of the virtual world model can be augmented based according to at least one of the vehicle data and the user data. In particular, in one embodiment, the virtual world model can be augmented based on vehicle dynamics data and/or the virtual view 702 can be rendered to an output device by controlling the output device to update display of the virtual view according to the vehicle dynamics data. In this way, the virtual view and objects of the virtual view are influenced by the vehicle data and/or the user data and the virtual view and objects of the virtual view are synchronized with the vehicle dynamics data. For example, the dynamic VR module 306 can augment the world structure class node 404 (e.g., the terrain class node) to dynamically generate and update the virtual view 702 with objects based on a location and an orientation of the vehicle 200 and a location and an orientation of the vehicle occupant 202. As an illustrative example, the vehicle 200 is driving in a mountainous region during the day. Accordingly based on the location and the orientation of the vehicle 200 and a time component determine from the vehicle data 318, the appearance and the terrain of the landscape object 706 in the virtual view 702 includes mountains and the sun 708. This is accomplished by augmenting the world structure class node 404 with the location and the orientation of the vehicle 200 and a time component determine from the vehicle data 318.

As another example, the fish object 710 can be generated as a type of fish indigenous to the location and the orientation of the vehicle 200 and the location and the orientation of the vehicle occupant 202. Further, the position of the fish object 710 can also be generated based on the location and the orientation of the vehicle 200 and the location and the orientation of the vehicle occupant 202. For example, the view class node 402 defining the position and the orientation of the fish object 710 can be augmented to present a point of view to the vehicle occupant 202 based on the location and the orientation of the vehicle 200 and the location and the orientation of the vehicle occupant 202.

As a further example, the water object 712 in the virtual view 702 can be generated based on the vehicle dynamics data. As an illustrative example, the vehicle data 318 can indicate a steady speed and yaw rate indicating a straight direction. Further, the user data 320 can indicate stead user motion. Accordingly, in FIG. 7A, the waves 714 appear clam and steady based on the vehicle data 318 and the user data 320. However, if the vehicle 200 suddenly increases in speed, as shown in FIG. 7B, the water object 724 including one or more waves 720 appear rough. In other embodiments, the water object 724 including the one or more waves 720 can be generated by altering the parallax motion or depth of motion of the view class node 402 based on the vehicle dynamics data.

In another embodiment, the yaw rate of the vehicle 200 and motion of the vehicle occupant 202 can be used to augment the view class node 402 of the boat object to generate a virtual view with the boat turning or moving based on the yaw rate of the vehicle 200 and the motion of the user 202. As is apparent, many variations of the virtual view can be generated based on the vehicle data 318, the user data 320 and the other data 322. In addition, in a situation where the virtual view is not in a game play mode (i.e., the virtual view presents game settings, user settings, start-up instructions), the virtual view is still generated and updated according to the vehicle dynamics data. Accordingly, by updating the virtual view according to the vehicle dynamics data in real-time, the virtual view presented to the user is dynamic and considers the vehicle motion and the user motion, thereby simulating the vehicle motion and the user motion in the virtual view in real-time. Not only does this provide a truly immersive virtual reality environment for the user, but virtual reality motion sickness can be minimized, because the virtual view considers the vehicle dynamics and the user motion.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for rendering views to an output device in a vehicle, wherein the vehicle is restricted to a fixed track that has a predetermined fixed path, comprising:
   receiving vehicle data about the vehicle, the vehicle data including a velocity, an orientation, and a location of the vehicle, from an off-vehicle device that is located remotely from the vehicle and along the predetermined fixed path;
   receiving user data about a user located in the vehicle, the user data including a velocity, an orientation, and a location of the user;
   generating a view based on the vehicle data, the user data, and a model, wherein the model includes one or more components that define the view, wherein the one or more components are virtual reality components;
   determining a difference between the vehicle data and the user data, wherein the one or more components of the model that define the view are augmented according to the difference between the vehicle data and the user data; and
   rendering the view to the output device by controlling the output device to display the view based on the one or more augmented components of the model that define the view.

2. The computer-implemented method of claim 1, wherein the off-vehicle device obtains the vehicle data externally from the vehicle within a frame of reference of an exterior environment of the vehicle.

3. The computer-implemented method of claim 1, wherein the off-vehicle device is an imaging unit mounted to a stationary structure external to the vehicle and along the predetermined fixed path.

4. The computer-implemented method of claim 1, wherein determining the difference between the user data and the vehicle data includes determining a relative velocity of the vehicle relative to the user and a relative velocity of the user relative to the vehicle, and rendering the view to the output device includes augmenting the one or more components of the model that define the view according to the determined difference between the relative velocity of the vehicle and the relative velocity of the user.

5. The computer-implemented method of claim 1, wherein the vehicle data includes predictive vehicle data defining a velocity, an orientation, and a location of the vehicle at a future location of the vehicle on the fixed track.

6. The computer-implemented method of claim 5, including modifying the view by triggering an event in the view according to the predictive vehicle data.

7. The computer-implemented method of claim 5, including modifying a node class of the model to trigger an event in the view according to the predictive vehicle data.

8. The computer-implemented method of claim 1, wherein the user data includes health data associated with the user and rendering the view to the output device includes augmenting the one or more components of the model that define the view based on the health data to minimize sensory processing.

9. The computer-implemented method of claim 1, wherein the one or more components of the model includes a group of node classes, each node class of the group of node classes defining a property of the model, wherein rendering the view includes augmenting one or more nodes of the group of node classes based on the difference between the vehicle data and the user data.

10. A computing system for rendering views to an output device in a vehicle, wherein the vehicle is restricted to a fixed track that has a predetermined fixed path, comprising:
a processor operably connected for computer communication to the output device, the processor including:
a virtual reality data module receives vehicle data from an off-vehicle device that is located remotely from the vehicle and along the predetermined fixed path, wherein the vehicle data includes a velocity, an orientation, and a location of the vehicle, the virtual reality data module receives predictive vehicle data including a velocity, an orientation, and a location of the vehicle at a future point in time corresponding to a future point in location on the fixed track,
and the virtual reality data module receives user data the from the off-vehicle device, the user data including a velocity, an orientation and a location of a user within a frame of reference of the vehicle, wherein the user is located in the vehicle;
a dynamic virtual reality module generates a view based on the vehicle data, the predictive vehicle data, the user data, and a model, wherein the model includes one or more components that define the view, wherein the one or more components are virtual reality components; and
a rendering module determines a difference between the user data and the vehicle data, wherein the one or more components of the model that define the view are augmented according to the difference between the user data and the vehicle data, and the rendering module renders the view to the output device by controlling the output device to update display of the view based on the one or more augmented components of the model that define the view.

11. The computing system of claim 10, the rendering module determines the difference between a relative velocity of the vehicle relative to the user and a relative velocity of the user relative to the vehicle based on the vehicle data and the user data.

12. The computing system of claim 11, wherein the rendering module renders the view to the output device by controlling the output device to update display of the view according to the determined difference between the relative velocity of the vehicle relative to the user and the relative velocity of the user relative to the vehicle.

13. The computing system of claim 10, wherein the off-vehicle device is an imaging unit mounted to a stationary structure external to the vehicle and along the predetermined fixed path.

14. The computing system of claim 10, wherein the user data includes health data associated with the user, the health data indicating a sensory issue and the rendering module renders the view to the output device by augmenting the one or more components of the model that define the view based on the health data to minimize the sensory issue.

15. The computing system of claim 10, wherein the dynamic virtual reality module determines a vehicle occupant action associated with the user and based on the vehicle data and the user data, and modifies the view according to an event defined by the model and triggered by the vehicle occupant action.

16. A non-transitory computer-readable medium comprising instructions that when executed by a processor perform a method for rendering views to an output device in a vehicle, wherein the vehicle is restricted to a fixed track that has a predetermined fixed path, comprising:
receiving vehicle data about the vehicle, the vehicle data including a velocity, an orientation, and a location of the vehicle, from an off-vehicle device that is located remotely from the vehicle and along the predetermined fixed path;
receiving user data about a user located in the vehicle, the user data including a velocity, an orientation, and a location of the user;
generating a view based on the vehicle data, the user data, and a model, wherein the model includes one or more components that define the view, wherein the one or more components are virtual reality components;
determining a difference between the vehicle data and the user data, wherein the one or more components of the model that define the view are augmented according to the difference between the vehicle data and the user data; and
rendering the view to the output device by controlling the output device to display the view based on the one or more augmented components of the model that define the view.

17. The non-transitory computer-readable medium of claim 16, wherein determining the difference between the user data and the vehicle data includes determining a relative velocity of the vehicle relative to the user and a relative velocity of the user relative to the vehicle, and rendering the view to the output device includes augmenting the one or more components of the model that define the view according to the model and the determined difference between the relative velocity of the vehicle and the relative velocity of the user.

18. The non-transitory computer-readable medium of claim 16, wherein the vehicle data includes predictive vehicle data defining the velocity, the orientation, and the location of the vehicle within the frame of reference of the exterior environment of the vehicle at a future point in time, and rendering the view to the output device includes updating display of the view according to the determined difference and the predictive vehicle data.

19. The non-transitory computer-readable medium of claim 16, wherein the one or more components of the model includes a group of node classes, each node class of the group of node classes defining a property of the model.

20. The non-transitory computer-readable medium of claim 19, wherein rendering the view includes augmenting one or more nodes of the group of node classes based on the difference between the vehicle data and the user data.

* * * * *